(12) United States Patent
Lion et al.

(10) Patent No.: US 11,920,984 B2
(45) Date of Patent: Mar. 5, 2024

(54) WIRELESS TEMPERATURE PROBE

(71) Applicant: Mastrad, Paris (FR)

(72) Inventors: Mathieu Lion, Paris (FR); Mathieu Picchi, Paris (FR); Jonathan Lion, Paris (FR)

(73) Assignee: Mastrad, Paris (FR)

( * ) Notice: Subject to any disclaimer, the term of this patent is extended or adjusted under 35 U.S.C. 154(b) by 1246 days.

(21) Appl. No.: 16/472,050

(22) PCT Filed: Dec. 20, 2017

(86) PCT No.: PCT/IB2017/058228
§ 371 (c)(1),
(2) Date: Jun. 20, 2019

(87) PCT Pub. No.: WO2019/012324
PCT Pub. Date: Jan. 17, 2019

(65) Prior Publication Data
US 2020/0096393 A1    Mar. 26, 2020

Related U.S. Application Data

(60) Provisional application No. 62/574,114, filed on Oct. 18, 2017, provisional application No. 62/547,003, filed on Aug. 17, 2017.

(30) Foreign Application Priority Data

Jul. 14, 2016  (FR) ........................................ 1656800
Jul. 13, 2017  (WO) .................. PCT/FR2017/051935

(51) Int. Cl.
*G01K 1/12* (2006.01)
*G01K 1/024* (2021.01)

(52) U.S. Cl.
CPC ............... *G01K 1/024* (2013.01); *G01K 1/12* (2013.01); *G01K 2207/06* (2013.01); *G01K 2215/00* (2013.01)

(58) Field of Classification Search
CPC ...... G01K 1/024; G01K 1/12; G01K 2207/06; G01K 2215/00; G01K 13/20; G01K 7/42;
(Continued)

(56) References Cited

U.S. PATENT DOCUMENTS 7,201,099 B2 * 4/2007 Harris, Jr. ................ G01K 1/02
                                                374/E1.002
8,172,459 B2 * 5/2012 Abreu .................. A61B 5/6814
                                                374/208

(Continued)

FOREIGN PATENT DOCUMENTS

CN    101479579 A  *  7/2009  ............. G01K 1/024
CN    112378543 A  *  2/2021  ............... G01K 1/02
(Continued)

OTHER PUBLICATIONS

16472050_2023-10-21_CN_112378543_A_H.pdf,Feb. 2021.*
(Continued)

*Primary Examiner* — Gail Kaplan Verbitsky
(74) *Attorney, Agent, or Firm* — Workman Nydegger

(57) ABSTRACT

Embodiments are directed to a system for aiding with the control of cooking. The system includes a thermometer probe that has an emitter, a controller unit or CPU, a battery power supply, and a thermally conductive shaft with a temperature sensor. The thermally conductive shaft is positioned in the interior of a heated milieu (e.g. a food item). The thermally conductive shaft includes a tip at a first end, and an end fitting at a second end. The battery and controller unit are positioned in the thermally conductive shaft, along with the temperature sensor, which is in thermal contact with (Continued)

the thermally conductive shaft. The end fitting is hollow such that the end fitting houses the emitter and a second temperature sensor. Other embodiments are directed to a method for computing a temperature variation speed from a temperature difference inside the end fitting.

24 Claims, 18 Drawing Sheets

(58) Field of Classification Search
CPC ...... G01K 13/00; G01K 2207/02; G01K 1/02; G01K 1/14; G01K 7/16; A47J 2202/00; A47J 27/002; A47J 36/2483; A47J 36/321; A47J 37/0786
USPC ..................................................... 340/870.17
See application file for complete search history.

(56) References Cited

U.S. PATENT DOCUMENTS

| | | | |
|---|---|---|---|
| 10,448,776 B2* | 10/2019 | Johncock | A47J 43/282 |
| 11,366,018 B1* | 6/2022 | Tan | G01K 1/024 |
| 2005/0201445 A1* | 9/2005 | Harris, Jr. | G01K 13/00 |
| | | | 374/208 |
| 2010/0100351 A1 | 4/2010 | Kobayashi | |
| 2012/0039356 A1* | 2/2012 | Adams | G01K 13/00 |
| | | | 374/155 |
| 2012/0225170 A1 | 9/2012 | Sonnendorfer | |
| 2015/0059469 A1* | 3/2015 | Batti | G01K 1/14 |
| | | | 374/208 |
| 2015/0168232 A1 | 6/2015 | Chu | |
| 2016/0377490 A1* | 12/2016 | Nivala | G01K 7/42 |
| | | | 374/155 |
| 2017/0122817 A1* | 5/2017 | Willert | G01K 1/022 |
| 2017/0138797 A1* | 5/2017 | Brown | G01K 1/14 |
| 2018/0353003 A1* | 12/2018 | Sabata | G01K 1/026 |
| 2019/0049314 A1* | 2/2019 | Chu | G01K 13/00 |
| 2019/0339133 A1* | 11/2019 | Pulvermacher | G01K 1/022 |
| 2020/0109877 A1* | 4/2020 | Chen | F24S 10/30 |
| 2020/0141813 A1* | 5/2020 | Nivala | G01K 13/00 |
| 2020/0214494 A1* | 7/2020 | Chu | G01K 1/024 |
| 2022/0333997 A1* | 10/2022 | Newhouse | G01K 1/024 |
| 2023/0213392 A1* | 7/2023 | Wang | G01K 13/20 |
| | | | 374/175 |

FOREIGN PATENT DOCUMENTS

| | | | | |
|---|---|---|---|---|
| CN | 113280939 A * | 8/2021 | | G01K 1/024 |
| DE | 148100 A1 * | 5/1981 | | |
| DE | 102007018245 A1 * | 10/2008 | | G01K 1/024 |
| DE | 102010015813 A1 * | 10/2011 | | G01F 1/684 |
| EP | 0 687 866 | 12/1995 | | |
| EP | 1 239 703 A2 | 9/2002 | | |
| EP | 1985983 A2 * | 10/2008 | | G01K 1/024 |
| WO | 2015/097407 | 7/2015 | | |

OTHER PUBLICATIONS

16472050_2023-10-21_CN_113280939_A_H.pdf,Aug. 2021.*
Written Opinion and International Search Report for PCT/IB2017/058228 dated Jul. 3, 2018.
Written Opinion and International Search Report for PCT/FR2017/051935 dated Oct. 9, 2017.

* cited by examiner

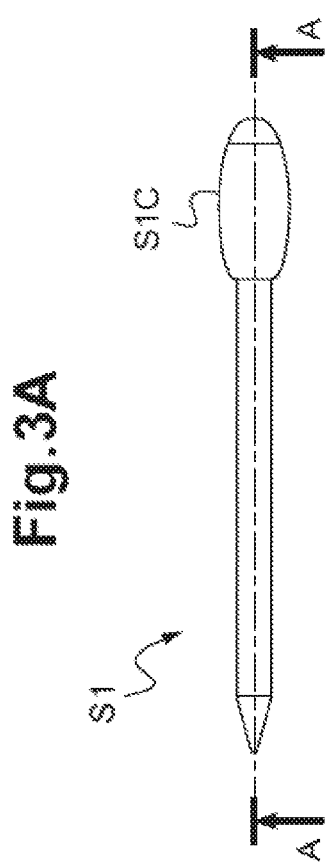
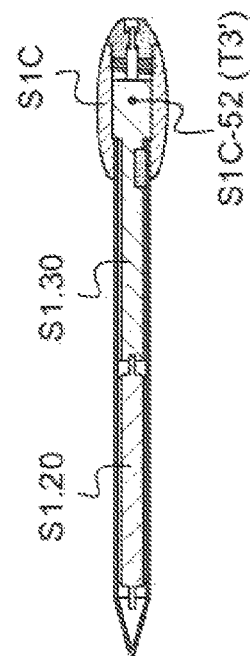
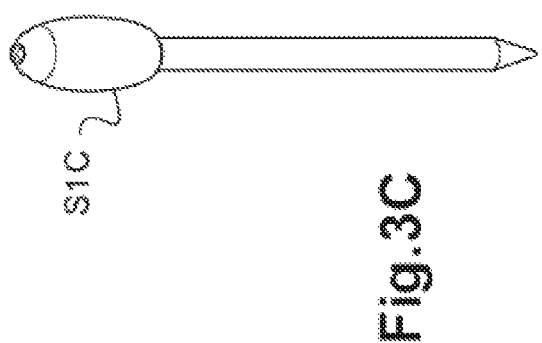
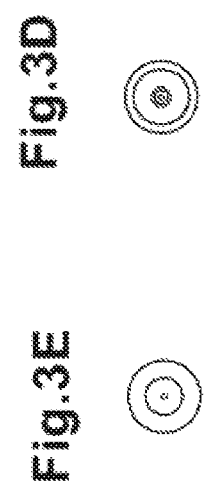
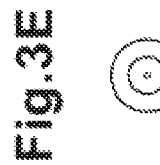

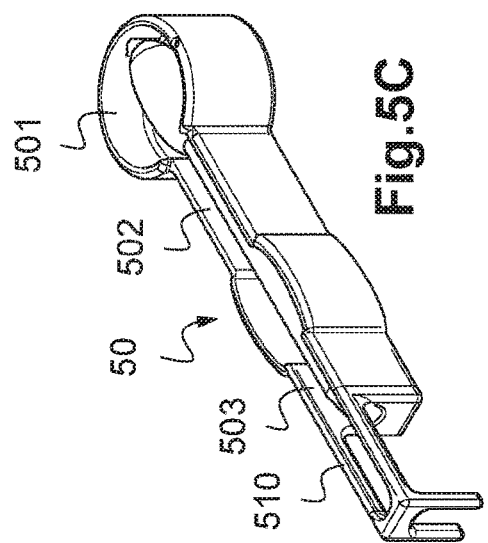
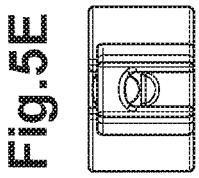
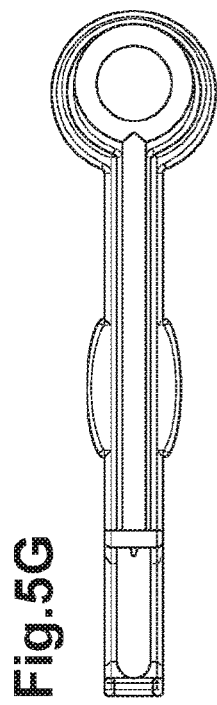
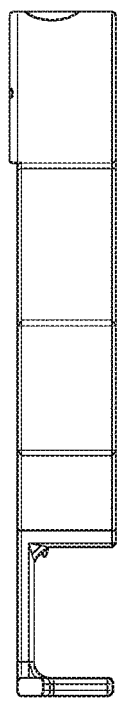
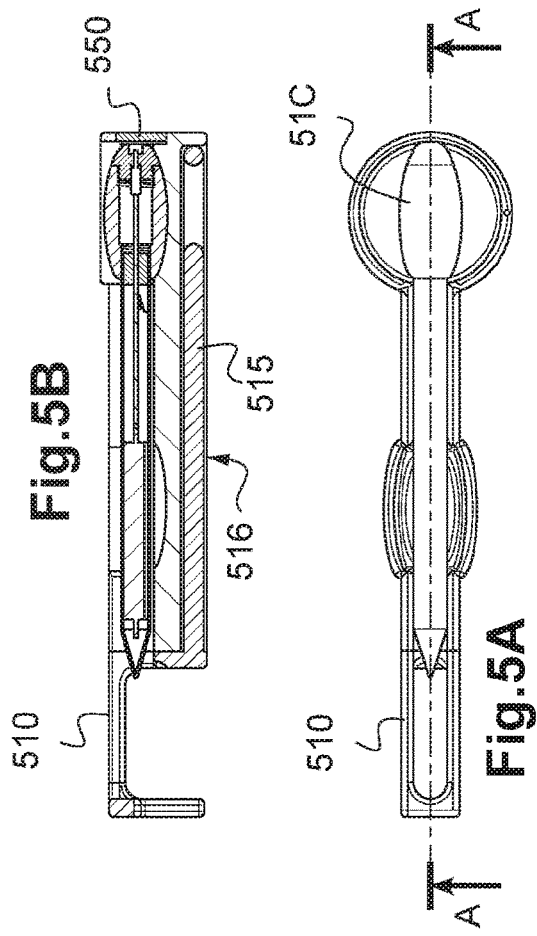
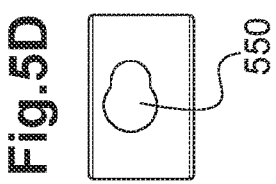

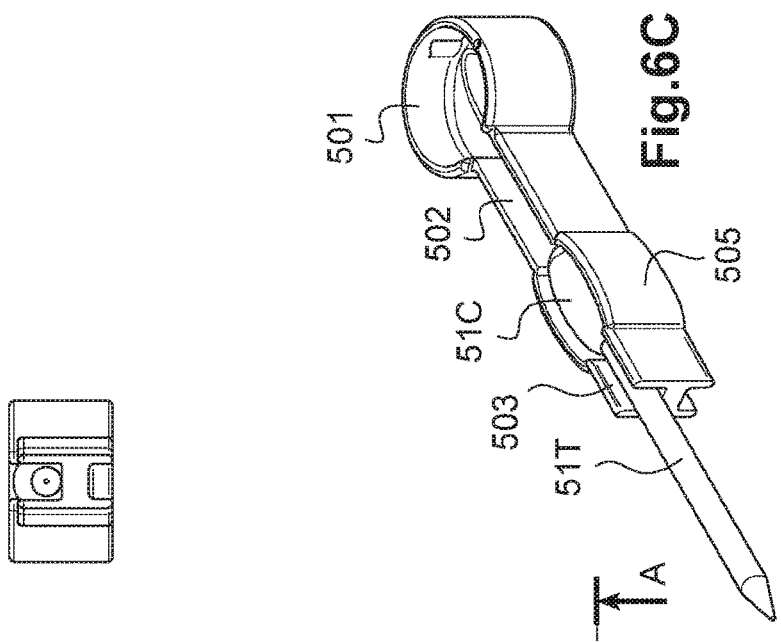
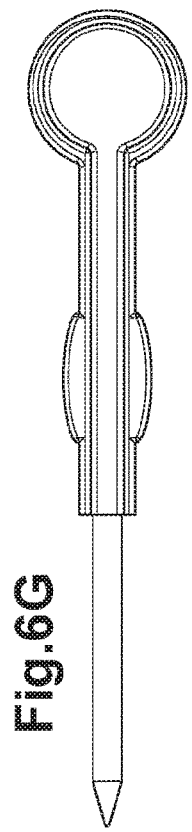
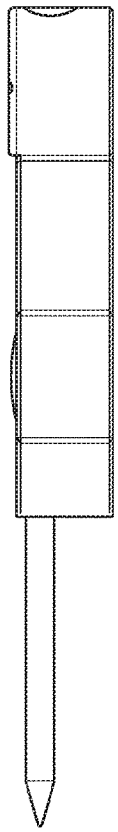
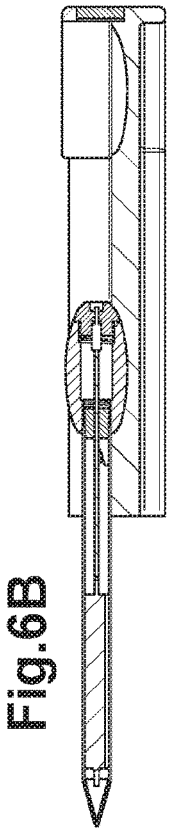
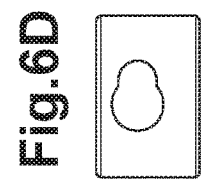
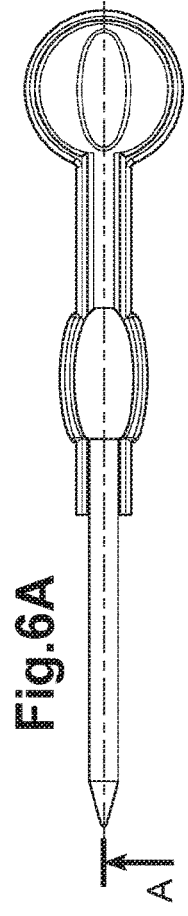

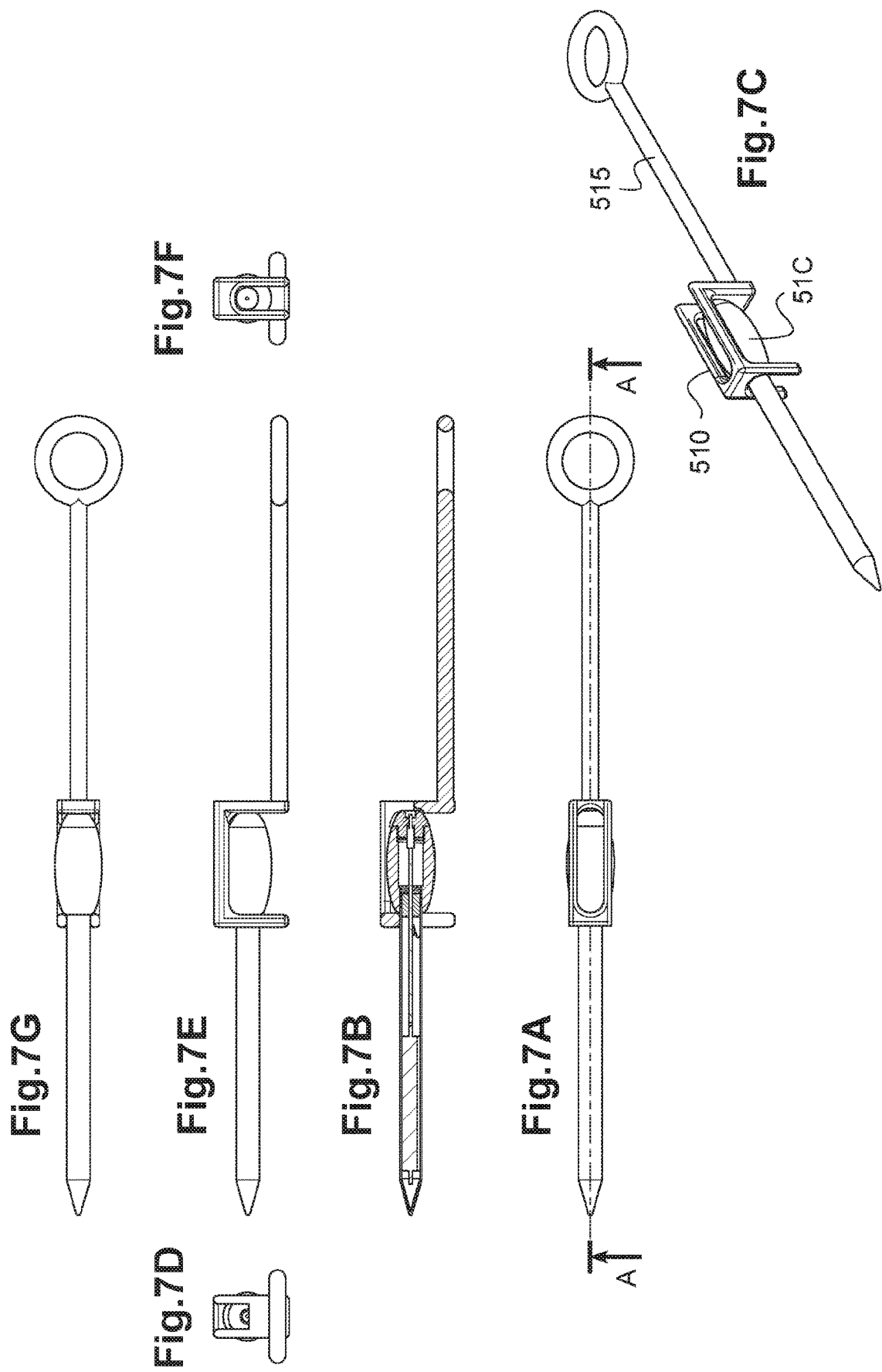

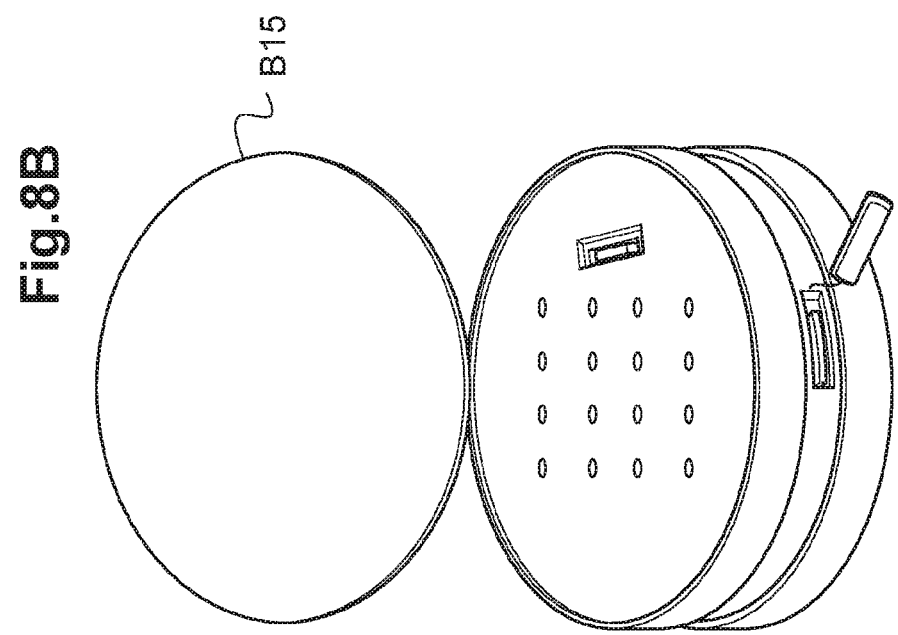
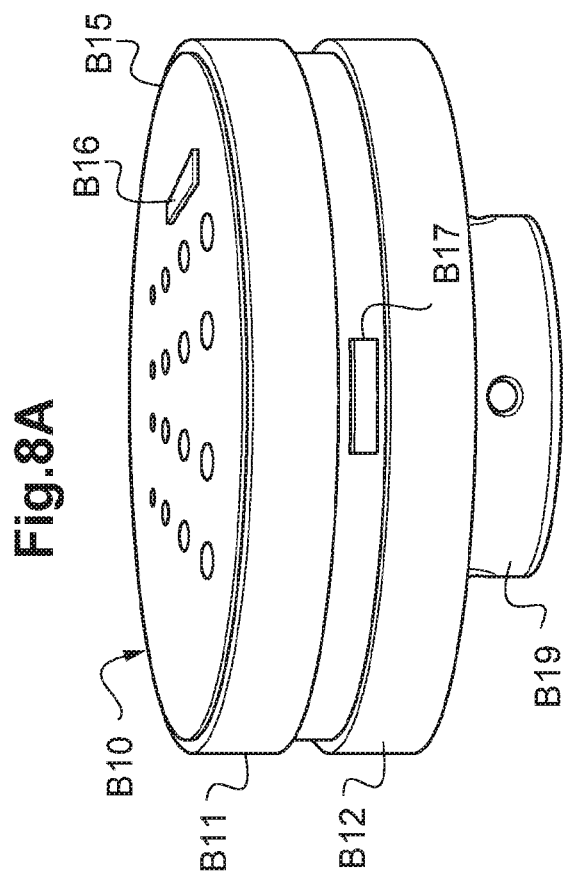
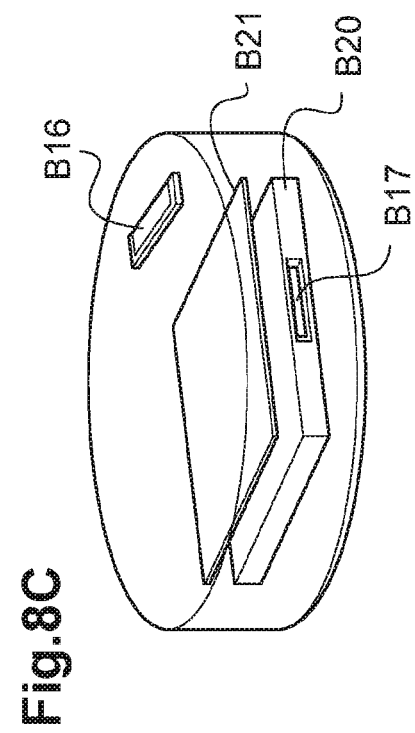

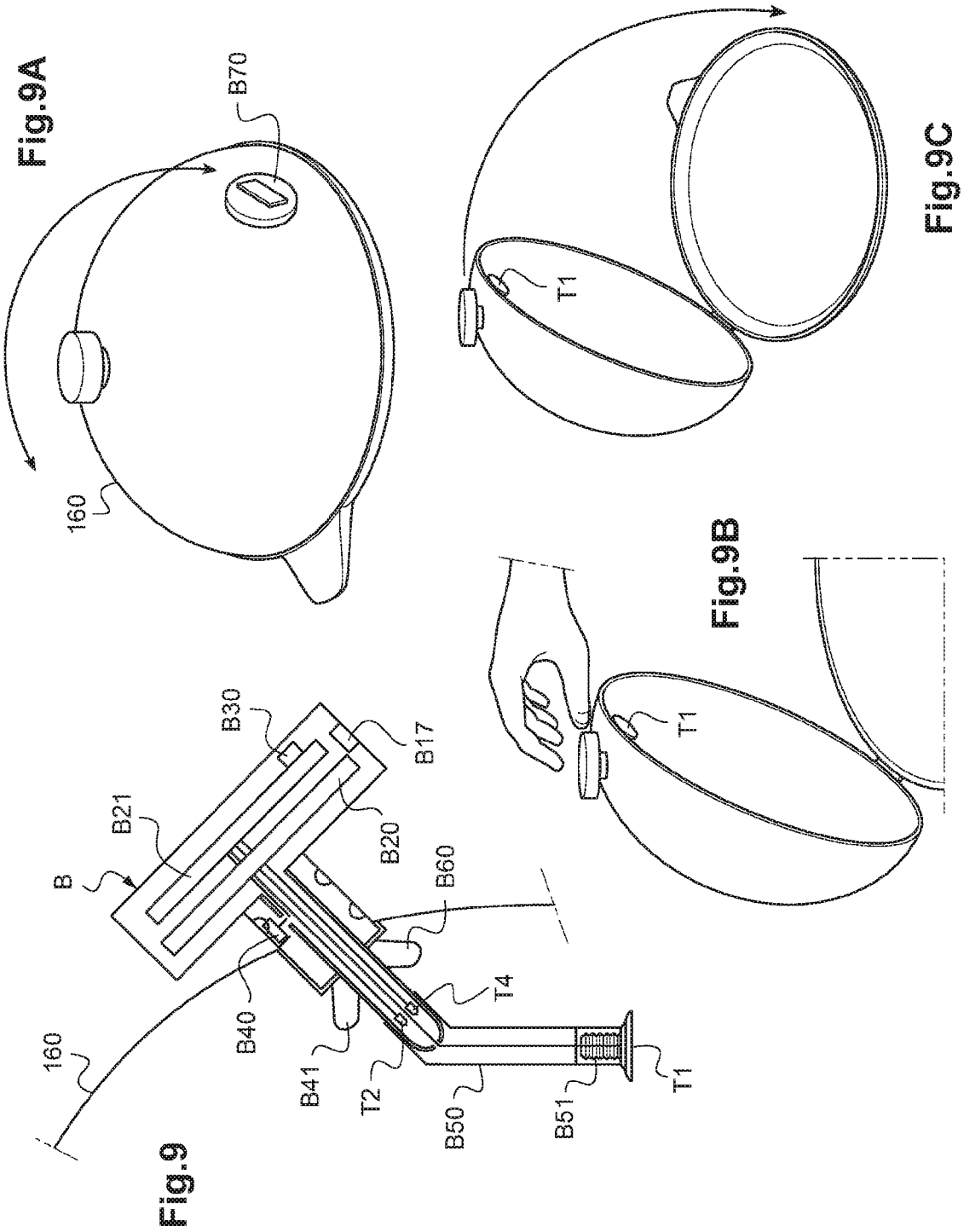

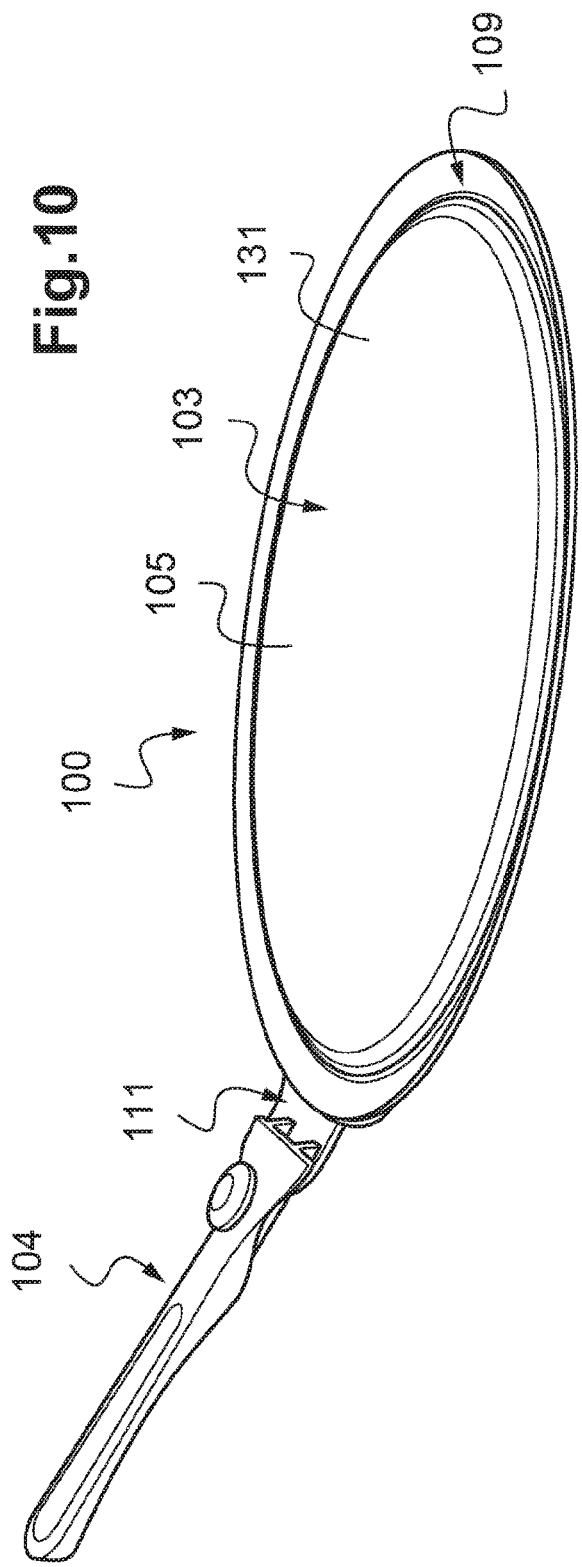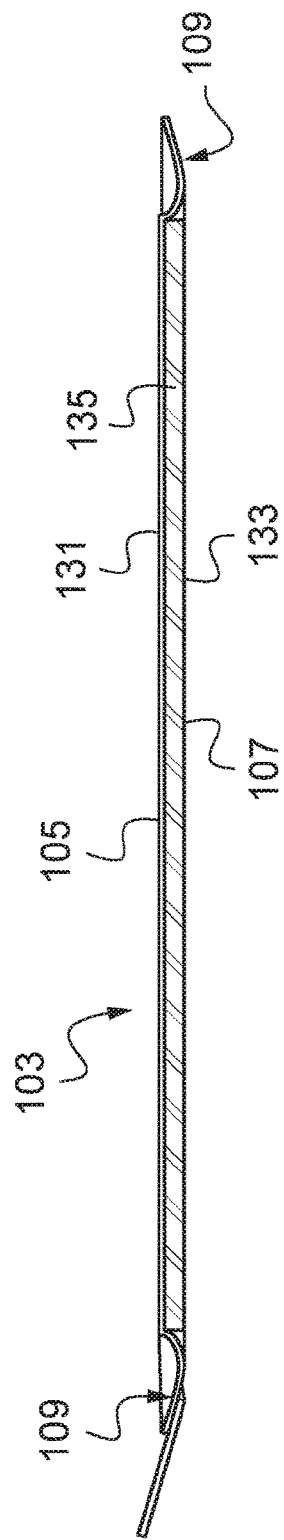

Flowchart of the cooking speed (300)

Blue stage: Low temperature - Under Heating

Green stage: Good temperature - Perfect Heating

Orange stage: Mid-High temperature - Probable Overheating

Red stage: High temperature - Danger

Logical test (600)

Logic equation:

CS = E $\oplus$ F $\oplus$ (B.C) $\oplus$ (B.D) $\oplus$ (A.B)

Variables of the CS equation from the reference system:

A = a < Sie < b

B = c < Tie < d

C = Sie < a

D = Sie > b

E = Tie < c

F = Tie > d

CUTVIEW A-A
SCALE 2 : 1

WIRELESS TEMPERATURE PROBE

CROSS-REFERENCE TO RELATED APPLICATIONS

This application is a 35 U.S.C. § 371 U.S. National Stage of International Application No. PCT/IB2017/058228, filed on Dec. 20, 2017, which claims priority to PCT Application PCT/FR2017/051935, filed on Jul. 13, 2017, which application claims priority to French application FR 16/56800, filed on Jul. 14, 2016. International Application No. PCT/IB2017/058228 further claims priority to and the benefit of U.S. Provisional Patent Application No. 62/547,003, filed Aug. 17, 2017, entitled "Improvement of Thermometer Probes for Cooking," and U.S. Provisional Patent Application No. 62/574,114, filed Oct. 18, 2017, entitled "Thermometer Probes for Cooking." Each of foregoing applications is incorporated by reference herein in their entireties.

BACKGROUND

Most of the time, users need to know what is happening during cooking, particularly in terms of temperature. Thermometers, or temperature probes, intended to be sunk into foodstuffs during cooking in order to monitor the internal temperature thereof are generally known. Such thermometers are not easy to use with container-and-cover assemblies in the closed state. Some of the models currently on the market link the sensor unit of the thermometer to a receiving unit through a cable. Such cables create other user issues including tangling, overheating, difficulty cleaning and storing. Thus, using current solutions, it is very difficult for the user to ascertain, as a function of time, the internal temperature of the foodstuffs during cooking.

BRIEF SUMMARY

Embodiments described herein are directed to a system for aiding with the control of cooking. The system includes a thermometer probe that includes an emitter, a battery power supply, and a thermally conductive shaft with at least one temperature sensor. The thermally conductive shaft is positioned in the interior of a heated milieu (e.g. a food item). The thermally conductive shaft includes a tip at a first end, and an end fitting at a second end. The battery and controller unit are positioned in the thermally conductive shaft, along with the temperature sensor, which is in thermal contact with the thermally conductive shaft. The end fitting is hollow such that the end fitting houses the emitter and a second temperature sensor.

Other embodiments are directed to a method for computing a temperature variation speed inside an end fitting from a temperature difference inside the end fitting. The method includes initialing a receiver box to monitor the cooking of an item. The receiver box is configured to receive data transmitted by an emitter in a thermometer probe. The method next includes acquiring a current temperature reading for the temperature inside the end fitting, and storing the current temperature reading. Further, the method includes starting a timer before the next temperature reading, acquiring a subsequent temperature reading inside the end fitting, and storing the subsequent temperature reading.

The method lastly includes computing a temperature variation speed inside the end fitting, determining the cooking speed by computing a logical test from a comparison of the initial temperature reading, the subsequent temperature reading and the temperature variation speed to a reference system, and providing a report to a user notifying the user of the determined cooking speed.

Still further, some embodiments are directed to a toolkit for aiding with the control of cooking is proposed, comprising: a thermometer probe provided with an emitter, and including a thermally conductive shaft, with at least one temperature sensor, which shaft is intended to be placed in the interior of a heated milieu, such as a piece of meat or fish, and provided with a battery power supply, the shaft possessing a tip at one of its ends, and an end fitting at its other end, characterized in that the temperature sensor (of the thermocouple or RTD (Resistance Temperature Detector) or thermistor type or any other sensor of reasonable size capable of measuring temperature) is placed in the shaft, in thermal contact with it and its tip, and in that the surface of the end fitting consists at least partially of metal and/or plastic and/or glass or ceramic.

This end fitting will be subjected to high heat while in use, whether from an oven, a stove or barbecue in which case it will be subject to direct contact with flames, which could be generated by flare up: dripping fat from foodstuff coming in contact with charcoal or gas flames and whose temperature exceed 500° C. for duration of several minutes. It is therefore needed that the end fitting will be resistant to flames, and insulating enough for the components inside it to be protected from heat above 180° C. during the whole cooking duration.

Preferably, the end fitting possesses an ovoid shape, substantially devoid of right cylindrical surfaces, thereby decreasing the amount of thermal radiation that it absorbs and increasing the volume of air thus allowing better insulation of the components inside of it. Preferably, the end fitting is made of ceramic which would be highly polished or recovered with reflecting high heat resistant enamel or paint as to reflect at best any radiant heat that the end fitting would be subjected to in use. In one embodiment, the end fitting comprises at least two superposed portions arranged in distinct layers, at least one of which mainly consists of a material, of the thermoplastic, ceramic or glass type, that is thermally insulating and resistant and permeable to electromagnetic waves such as Bluetooth waves.

In one embodiment, the end fitting is hollow in order to come to house, apart from an electromagnetic wave emitter, a second temperature sensor as described below and a overheated temperature witness as described below, an internal insulating layer that is not securely fastened to the end fitting and/or an internal insulating layer between each layer of the end fitting if the latter possesses a plurality thereof, made of fiber, foam or bead aerogel or coating, preferably epoxy coating or mineral type. The upper layer of the end fitting when the latter possesses a plurality thereof, may be removable in order to be interchangeable.

Provision may be made for an overheating indicator S1C-55, placed beside the electromagnetic wave emitter in the interior of the end fitting and taking the form of a small rod of a few millimeters thickness, made of thermoplastic, of the polystyrene or polyethylene type, and which degrades irreversibly at a temperature above 200° C.

In the thermometer probe S1 (as generally shown in FIGS. 3A-3E), another temperature sensor, of for example, the thermistor or RTD (Resistance Temperature Detector) or thermocouple, may be added, said sensor being placed beside the electromagnetic wave emitter in the interior of the end fitting (S1C-52), (also referenced T3' below). Placing the sensor inside the end fitting with direct contact to the inner part of the end fitting but not in contact with the outside environment, protects such sensor from overheating during high heat or long cooking and including flare up with flames above a temperature of 500° C.

Measuring the internal temperature of the end fitting allows the user to sense indirectly variations of the outside ambient conditions without direct contact with high heat or with direct flare up (>500° C.). This also allows the use of a thermistor sensor, efficient enough instead of using a thermocouple or a RTD sensor, much more expensive and mandatory for such high temperature, above 500° C. A thermocouple or a RTD sensor also use much more electrical power, especially at high temperature, than a thermistor, thus obliging the use of a larger power supply which has to be located in the thin shaft.

Moreover, measuring the internal temperature of the end fitting avoids the use of an outside sensor which through its connecting wires will conduct the heat from outside to inside the shaft and avoid exceeding a (potentially) maximal operating temperature of 100° C., dictated by the limited heat resistance of the battery and PCB. High temperature may also cause several problems, on the first hand with the user and the user's misunderstanding of this unnatural very high temperature, which is usually not measured, and on the other hand some difficulties to make some good measurements due to high temperature variation and knowing that higher is the temperature, lower is the accuracy.

Sensors are provided which measure an ambient temperature (outside temperature) and attached to a metal part which is directly in contact with the outside, thus subjecting it to direct heat and flare up.

The use of outside ambient temperature sensor, such as with a thermocouple or RTD, will subject the sensor and other peripherals to wear and fatigue, due to constant and extreme heat changes. Furthermore, smoke and grease projection on the probe during cooking might render the outside protuberance of the sensor difficult to wash and thus unhealthy.

Locating the sensor inside the end fitting measures the temperature to monitor both the Bluetooth antenna chips AND the cooking speed. This cooking speed alerts you by an audible and/or visual message if you're cooking too fast with flames, or that your meat probably burning or, conversely, that the cooking is too slow, or that the heat source or cooktops are cooling down.

Such a sensor measures and transmits via the transmitter of the cooking probe to a receiver box. This receiver box continually or continuously records the internal temperature of the end fitting to compute and determine the cooking speed and then translate a certain stage compared to a reference system. A plurality of methods can be used to obtain this cooking speed based either on the simple measure and/or the average.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 3A is a profile view of a proposed new thermometer probe.

FIG. 3B is a cross-sectional view of this probe along the sectional line A-A in FIG. 3A.

FIG. 3C is a vertical perspective view of the probe in FIG. 3A.

FIG. 3D is a right-hand view of the probe in FIG. 3A.

FIG. 3E is a left-hand view of the probe in FIG. 3A.

FIG. 5A is a top view of a receptacle suitable for the probe in FIGS. 3A-3E, and containing this probe in a storage position.

FIG. 5B is a cross-sectional view along the sectional line A-A in FIG. 4A.

FIG. 5C is an oblique perspective view of the receptacle in FIG. 5A.

FIGS. 5D and 5E are respectively a right-hand view and a left-hand view of the receptacle in FIG. 5F, FIG. 5F is a profile view of the receptacle in FIG. 5A.

FIG. 5G is a bottom view of the receptacle in FIG. 5A.

FIGS. 6A-6G correspond to FIGS. 5A-5G, but with the probe in an intermediate position in the receptacle.

FIG. 7A is a top view in which a handling tool, taken out of the receptacle, is engaged under the probe in order to extract the latter.

FIG. 7B is a cross-sectional view along the sectional line A-A in FIG. 7A.

FIG. 7C is an oblique perspective view corresponding to FIG. 7A.

FIG. 7E is a profile view corresponding to FIG. 7A.

FIGS. 7D and 7F are respectively a right-hand view and a left-hand view corresponding to FIG. 7A.

FIG. 7G is a bottom view corresponding to FIG. 7A.

FIG. 8A is a schematic perspective view of a "knob" variant of the box in FIG. 2C.

FIG. 8B illustrates the box-knob in FIG. 8A, with its top cover in an open position.

FIG. 8C schematically illustrates an example of the internal content of the box-knob in FIGS. 8A and 8B.

FIG. 9 illustrates a preferred example of attachment of a box-knob to a cover of a cooking apparatus.

FIGS. 9A, 9B and 9C illustrate the attachment of FIG. 9, with the cover in an open position.

FIG. 10 shows a perspective view of a cooking utensil of the plancha type.

FIG. 11 shows a cross-sectional view of the cooking utensil in FIG. 10.

DETAILED DESCRIPTION

As noted above, the embodiments described herein are generally directed to methods and systems for aiding with the control of cooking. In one embodiment, the system includes a thermometer probe that includes an emitter, a battery power supply, and a thermally conductive shaft with at least one temperature sensor. The thermally conductive shaft is positioned in the interior of a heated milieu (e.g. a food item). The thermally conductive shaft includes a tip at a first end, and an end fitting at a second end. The battery and controller unit are positioned in the thermally conductive shaft, along with the temperature sensor, which is in thermal contact with the thermally conductive shaft. The end fitting is hollow such that the end fitting houses the emitter and a second temperature sensor.

In another embodiment, a method is provided for computing a temperature variation speed inside an end fitting from a temperature difference inside the end fitting. The method includes initiating a receiver box to monitor the cooking of an item. The receiver box is configured to receive data transmitted by an emitter in a thermometer probe. The method next includes acquiring a current temperature reading for the temperature inside the end fitting, and storing the current temperature reading. Further, the method includes starting a timer before the next temperature reading, acquiring a subsequent temperature reading inside the end fitting, and storing the subsequent temperature reading.

The method lastly includes computing a temperature variation speed inside the end fitting, determining the cooking speed by computing a logical test from a comparison of the initial temperature reading, the subsequent temperature reading and the temperature variation speed to a reference system, and providing a report to a user notifying the user of the determined cooking speed.

As used herein, the terms "top", "bottom", "horizontal" and "vertical" are used with reference to the arrangement and orientation of a cooking utensil placed on a substantially horizontal hob so that the hob forms a source of energy allowing foodstuffs placed on the cooking utensil to be heated. The term "level" here designates a relative vertical position, i.e. a height, for example with respect to the plane of the hob.

In its U.S. Pat. No. 7,075,442 (or WO 2005/003703 or EP1646851), the disclosures of which are incorporated herein by reference in their entirety, the Applicant has described a temperature probe able to transmit wirelessly, which may be brought into contact with foodstuffs in the process of cooking, or even be sunk into the interior thereof.

Figure 1:
FIG. 1 is a profile view of a thermometer probe.

In FIG. 1, the probe, here referenced S1, comprises a temperature sensor S1-10 (also referenced as T3 below), connected to a main printed circuit board S1-30. Between the two (for example) a battery S1-20 is provided. Preferably, the battery is non-saline and non-alkaline.

Figure 1A:
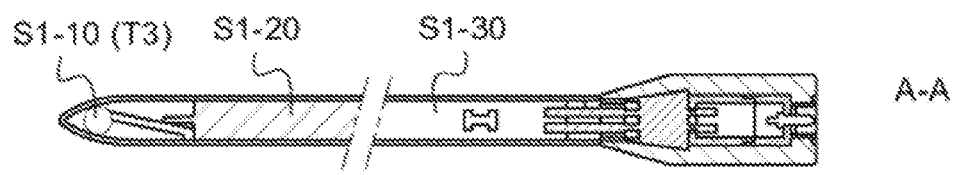
FIG. 1A is a cross-sectional view along the line A-A in FIG. 1.
Figure 1B:
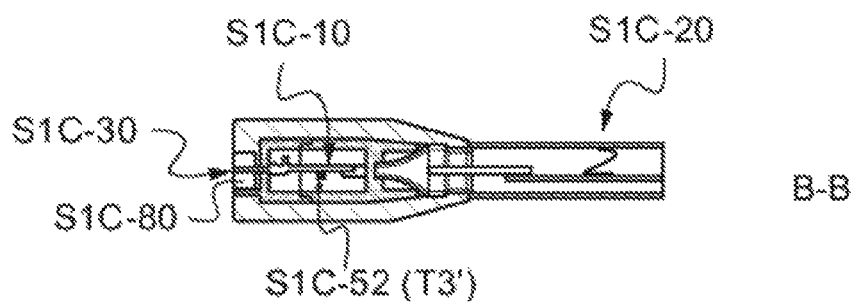
FIG. 1B is a cross-sectional view along the line B-B in FIG. 1D.
Figure 1C:
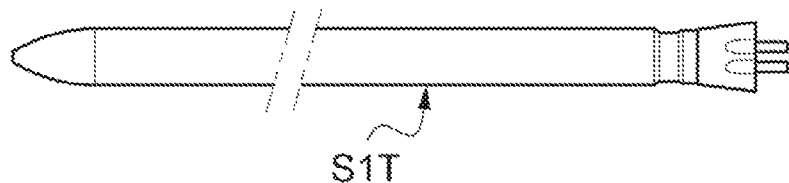
FIG. 1C is a profile view of a portion of the probe in FIG. 1A.
Figure 1D:
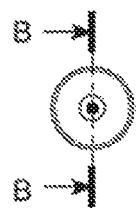
FIGS. 1D and 1G are a right-hand view and a left-hand view of the probe in FIG. 1.

For example, the Dallas Semiconductor temperature sensors D81620, D81721, D81820, or more recently DS18B20 have calculated temperature ranges extending from −55° C. to 125° C., with precision tolerances of less than 0.5° C. The main printed circuit board S1-30 ensures the pre-processing of the signal output from the sensor S1-10. The probe S1 includes a shaft S1T (FIG. 1C), which forms the actual probe, and is equipped with a terminal end fitting S1C at its end opposite the sensor S1-10.

This end fitting contains a wireless emitter printed circuit board S1C-10, including an emitter chip, for example a Bluetooth chip, and an antenna. This end fitting may also comprise thermally insulating elements and a charging pole (S1C-30) Such charging pole being contained in concave cavity (S1C-80) as to avoid direct contact with radiant heat and to reflect away at best such radiant heat from the charging pole, thus lowering the amount of thermic heat transmitted by the charging pole to the end fitting and ultimately to the shaft. This end fitting may contain a breathable membrane, of PTFE type, allowing the hot air contained in S1 to be released and therefore pressure to be lowered and internal temperature to be decreased.

Figure 1E:
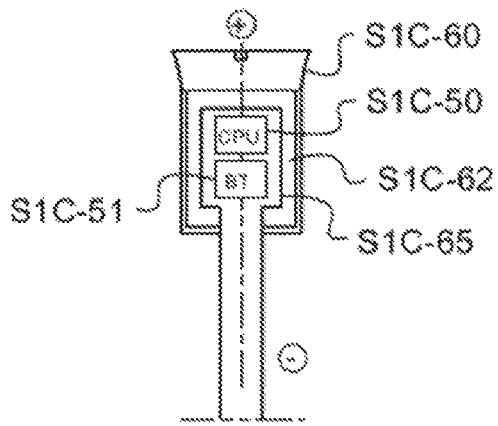
FIG. 1E, illustrates, in cross section, one embodiment of the end fitting S1C of the probe in FIGS. 1A and 1B.
Figure 1F:
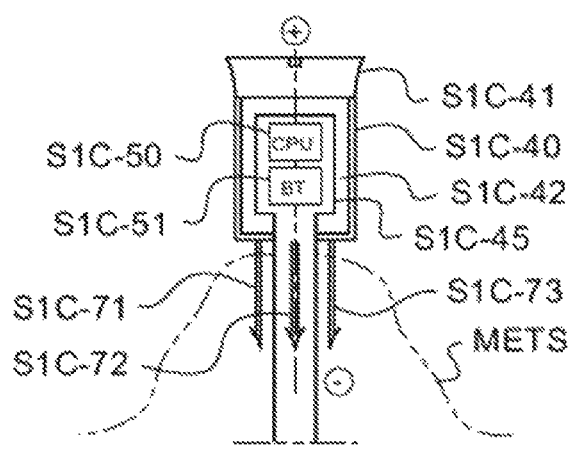
FIG. 1F illustrates, in cross section, another embodiment of the end fitting S1C of the probe in FIGS. 1A and 1B.
Figure 1G:
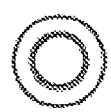
Figure 2A:
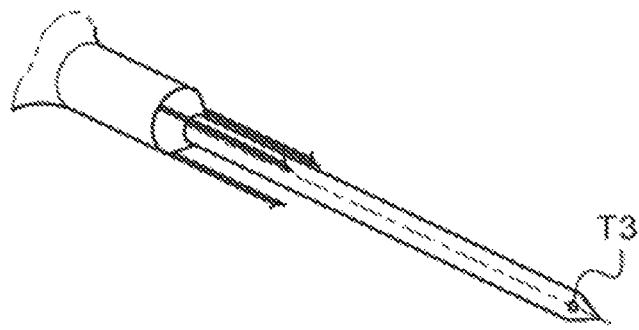
FIG. 2A is a schematic view of a probe similar to that in FIG. 1.
Figure 2B:
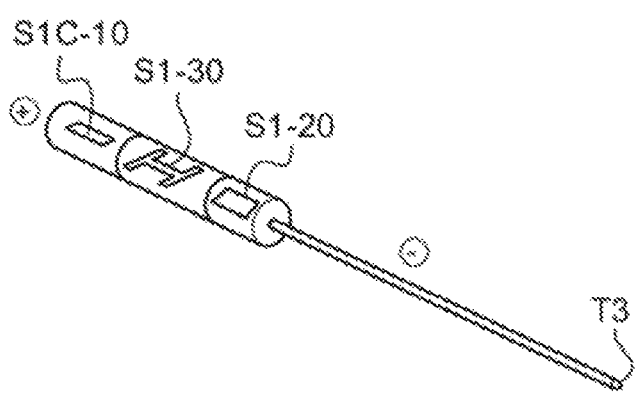
FIG. 2B is a schematic view of one variant of the probe in FIG. 2A.
Figure 2C:
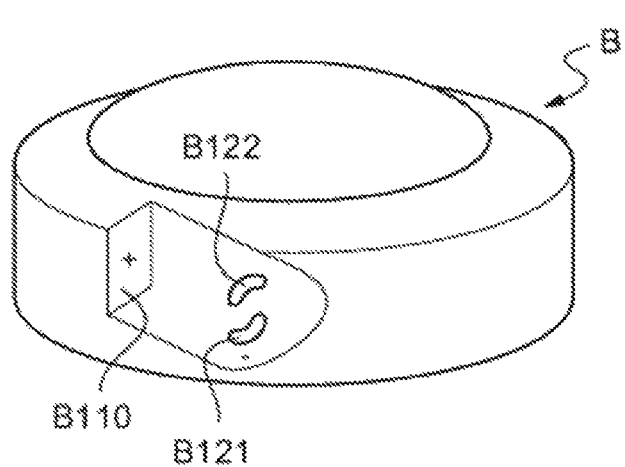
FIG. 2C is a perspective view of a box able to accommodate the probe in FIG. 2A.
Figure 2D:
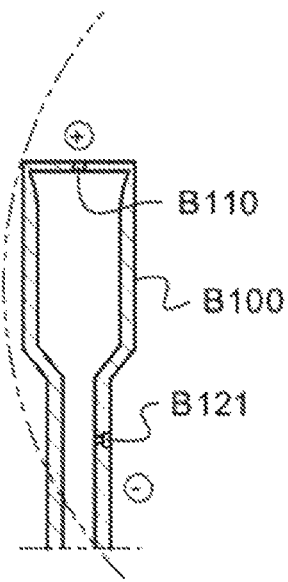

The antenna of S1 must be positioned outside of the food. In one example (FIG. 1F), it may advantageously be covered with a jacket S1C-40 made of polished anodized aluminum (to refract radiant heat) and, on top, with a ceramic cap S1C-41, which may include a positive charging contact, the stainless steel probe shaft being the negative contact. The jacket, which may be made of aluminum or ceramic or glass or metal or thermoplastic or a combination of such materials, is separated in the interior by an air-filled space S1C-42 from the assembly formed by the Bluetooth antenna (BT), which is referenced S1C-51, and its CPU or controller unit (e.g. chip S1C-10). This assembly is then over-molded (S1C-45) with high temperature thermoplastic (of the PEEK or HT ABS type, which may be replaced or supplemented with another aluminum jacket (multilayer) if necessary, for very-high-temperature uses).

The aluminum jacket S1C-40 may be crimped onto the steel probe S1T; it may also include in its bottom portion sharp protrusions made of aluminum or even of another thermally conductive material such as a steel or titanium alloy. There will preferably be 3 protrusions S1C-71, S1C-72 and S1C-73, of the knitting needle kind, of a diameter of about 1 mm, and which may include barb or fishing-hook type end spurs in order that the probe remains securely in place even in a rotating rotisserie. It is a question of penetrating the meat or fish (METS) to a depth of about 3 to 10 centimeters, typically 5 centimeters, in order to form heat sinks, in order to cool the aluminum jacket and its interior, and therefore the antenna. It will not necessarily be essential to insert these sinks when small pieces are being cooked, because the duration of exposure of the probe to heat is then shorter.

The aforementioned multilayer may be made, as regards the exterior layer, of glass or ceramic or anodized aluminum, be electrically insulated and be filled with insulating foam (whatever the combination of materials used). It includes a portion that is permeable to Bluetooth electromagnetic waves (made of ceramic or glass for example) and a charging pole.

In another variant (FIG. 1E), the antenna of S1 remains positioned outside of the food. It may be covered with a jacket S1C-60 made of PEEK or very high-resistance thermoplastic, which may include, on top, a positive charging contact, the steel probe being the negative contact. The PEEK jacket is separated, in the interior, at S1C-62, by an air-filled space or insulating foam, from the assembly formed by the Bluetooth antenna S1C-51 and its CPU (e.g. chip S1C-10, above). This assembly will be over-molded, at S1C-65, with a high-temperature thermoplastic (of the PEEK or HT ABS type).

The solution made of aluminum or ceramic or glass or thermoplastic is effective, above all with respect to the heat sinks. The thermally insulating elements may also be, in the case of a multilayer end fitting, partially made of steel, as regards the exterior layer, and equipped with heat sinks, though this solution is less effective.

To save its energy, the probe wirelessly may emit thermometer data in bursts, the frequency of which may vary as a function of time, for example as follows: every 15 seconds during the 1st quarter of an hour, every 30 seconds between 0.25 hours and 0.50 hours, every minute after 0.5 hours.

The periodicity of the bursts is, approximately, proportional to the cooking time passed, or in any case, increases with this cooking time. In other words, the frequency or rate of the bursts, i.e. the number of bursts per unit time, decreases with the increase (passing) of the cooking time. The start of the cooking may be defined by the fact that the probe is activated when it is removed from its holder. Next, the tracking of the cooking starts when S1 and the box B have detected an upwards temperature variation.

This emission in bursts may be managed at the level of the main printed circuit board S1-30, or indeed at the level of the wireless emitter printed circuit board S1C-10, or via interaction of these two boards. These two circuit boards may be merged into one and housed in the tube S1T, in which case only an antenna wire need be run to the end fitting S1C. In this case, all the electronics are placed in the tube S1T and not in the end fitting S1C, and they are therefore well insulated by the eatables.

The wireless emission may take the form of Bluetooth signals or other microwave signals. The Applicant has observed that Bluetooth signals are able to escape from a cooking enclosure, even one made entirely of metal and closed by a metal door, with a sufficient intensity. It seems that the Bluetooth signals (version 3, 4 or later 5) pass at the door joint, or via other gaps that let air pass. The ability of the electronics of this probe to operate properly is due to the fact that they are subjected to the temperature of the foodstuff during cooking, which is generally lower than the temperature of the interior of the cooking enclosure. The temperature of the foodstuff does not exceed 100° C.

It is recommended to take measures to ensure the electronics and battery, do not get too hot, in contact with the eatable in the process of cooking. The dimensions in millimeters indicated in FIG. 1A may correspond to the case of a turkey that is cooked 6 hours at a little less than 165° C. Its interior temperature is about 80° C. at the end of cooking. Other eatables are cooked for less time. Even with the energy saving made possible by the emission in bursts, it is necessary to ensure that the storage capacity of the battery is sufficient to cover long cooking times. The dimensional and technical characteristics of the sensor, of the electronics and of the battery will be adapted accordingly. In particular, the capacity and size of the battery may be decreased for cooking times shorter than six hours.

Multiple probes of this type S1 may be used if they emit at slightly different frequencies or over slightly different channels. This is implementable in Bluetooth. In such case the user interface shall allow the user to reference each probe by the name of its choice (for example the type of meat being cooked) before the start of cooking or during cooking in order not to be confused while cooking.

A new and improved temperature probe will now be described with reference to FIGS. 3A to 3E. In a shaft S1T, it includes a battery S1-20, and a printed circuit board S1-30. The temperature sensor may be a thermocouple or RTD (Resistance Temperature Detector) housed in the tip, or indeed a sensor, such as a thermistor or the DS18B20 sensor mentioned above, mounted on the printed circuit board S1-30. Instead of having a general cylindrical shape, the end fitting S1C is of ovoid shape. The surface of the end fitting at least partially consists of ceramic or glass.

Figure 4C:
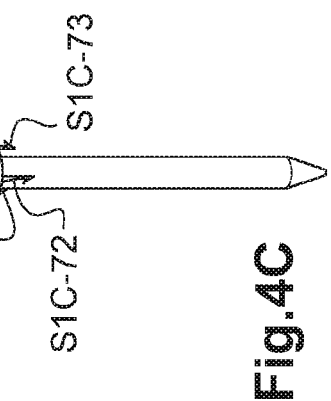
FIG. 4C is a vertical perspective view of the probe in FIG. 4A.
Figure 4B:
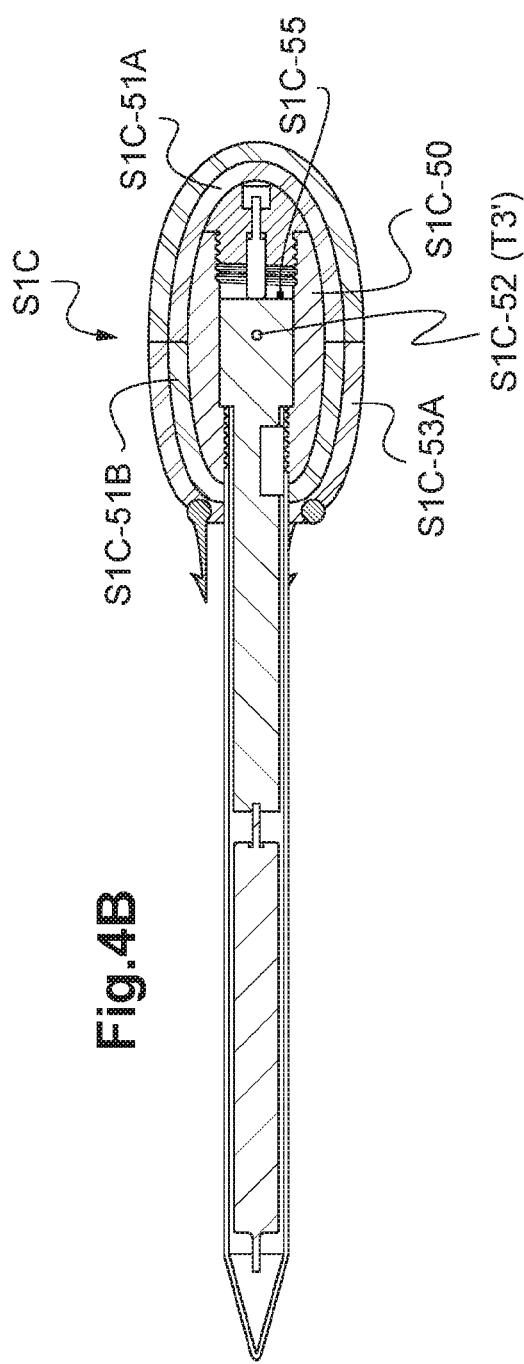
FIG. 4B is a cross-sectional view along the sectional line B-B of the probe in FIG. 4A.
Figure 4A:
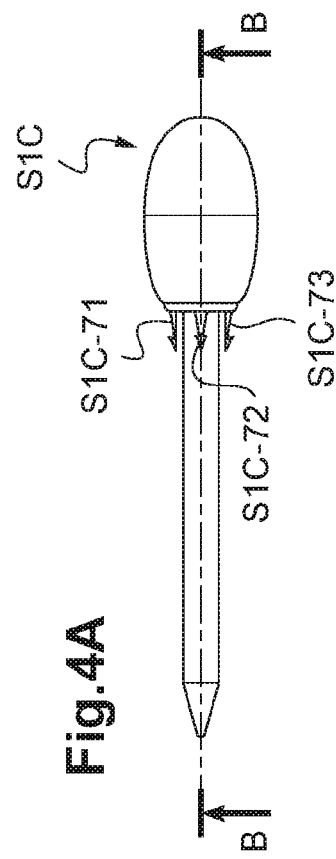
FIG. 4A is a profile view of one variant of the probe, in which the probe is double-walled.

In the variant in FIG. 4B, the end fitting S1C is enclosed in a multilayer skin, placed around its core S1C-50, which may be made of zirconium dioxide. The internal wall S1C-51A and S1C-51B may be an insulator based on epoxy coating or mineral or aerogel fibers, foam or beads. The shaft-side external wall, S1C-53A, and end-side external wall, S1C-53B, may be made of zirconium dioxide or of an aluminum alloy or even of glass. The internal and external walls are made of two portions, in order to better match the ovoid shape of the core S1C-50. These two portions may be fastened by clips or by screws. Internally, the end fitting S1C may be constructed as described above in detail with reference to FIG. 1B.

Internally, into the end fitting, it is possible to integrate an overheating indicator, taking the form of a small rod of a few millimeters thickness and made from thermoplastic, of the polystyrene or polypropylene type, which degrades irreversibly at a temperature above 200° C., indicating whether inappropriate use has been made by the user.

Another temperature sensor (T3'), of the thermocouple or RTD (Resistance Temperature Detector) or thermistor type, provided in the interior of the end fitting, continuously (or in bursts) measures and transmits to a box B for recording the internal temperature, making it possible to determine the inappropriate use and warns the user in case of overheating while the receiving interface determines the cooking speed and indicates a stage.

The multilayer end fitting includes a (ceramic or glass) portion that is permeable to Bluetooth electromagnetic waves and a charging pole. Such charging pole being contained in concave cavity as to avoid direct contact with radiant heat, thus lowering the amount of thermic heat transmitted by the charging pole to the end fitting and ultimately to the shaft. The temperature probe may interact with an external unit, one example of which is given by the box B in FIGS. 2A to 2E, and/or in FIGS. 8A to 8C, and 9.

As described above, with reference to FIG. 1F, one of the layers is equipped with spurs (S1C-71, S1C-72, and S1C-73)

that are intended to be plunged into an eatable, in order to serve as heat sinks. One thereof may be clearly seen in FIG. 4B, and three thereof may be seen in FIG. 4C.

In the basic embodiment of the probe S1 (FIGS. 1A-1G and FIG. 2A) some of the electronics is housed in its shaft. As a variant (probe S1b, FIG. 2B), the electronics (S1-20, S1-30 and S1C-10) may be integrally placed in the end fitting of the probe, which if so required may be increased in length. The shaft may then take the form of a needle, which contains only the thermocouple or RTD (Resistance Temperature Detector), or thermistor (temperature probe T3), the electronics and antenna being located in the end fitting. This allows the probe to be inserted into a sous vide cooking bag without damaging it or to be used as a wireless sugar or oil thermometer as those edible cook above 90° C. they cannot be measured with the electronic and power supply being inside the shaft This also goes for a steam oven, or even a pressure cooker, since these modes of cooking are carried out at about 130° C. However, the end fitting itself cannot be submerged in water, as Bluetooth signals do not pass through water.

The temperature probe 51C may interact with a receptacle, which will now be described, with reference to FIGS. 5A to 7G. The receptacle 50 forms housing for the probe S1. Its end fitting S1C rests in a cylindrical alcove 501 that is adapted to its shape. Its shaft S1T rests in a channel 502, 503 of elongate, generally rectangular shape. The end of the receptacle, end-fitting side, is provided with a USB port 550 for recharging the battery of the probe. Optionally with a buffer battery housed in the receptacle to recharge the battery independently of the USB port.

Figure 16:
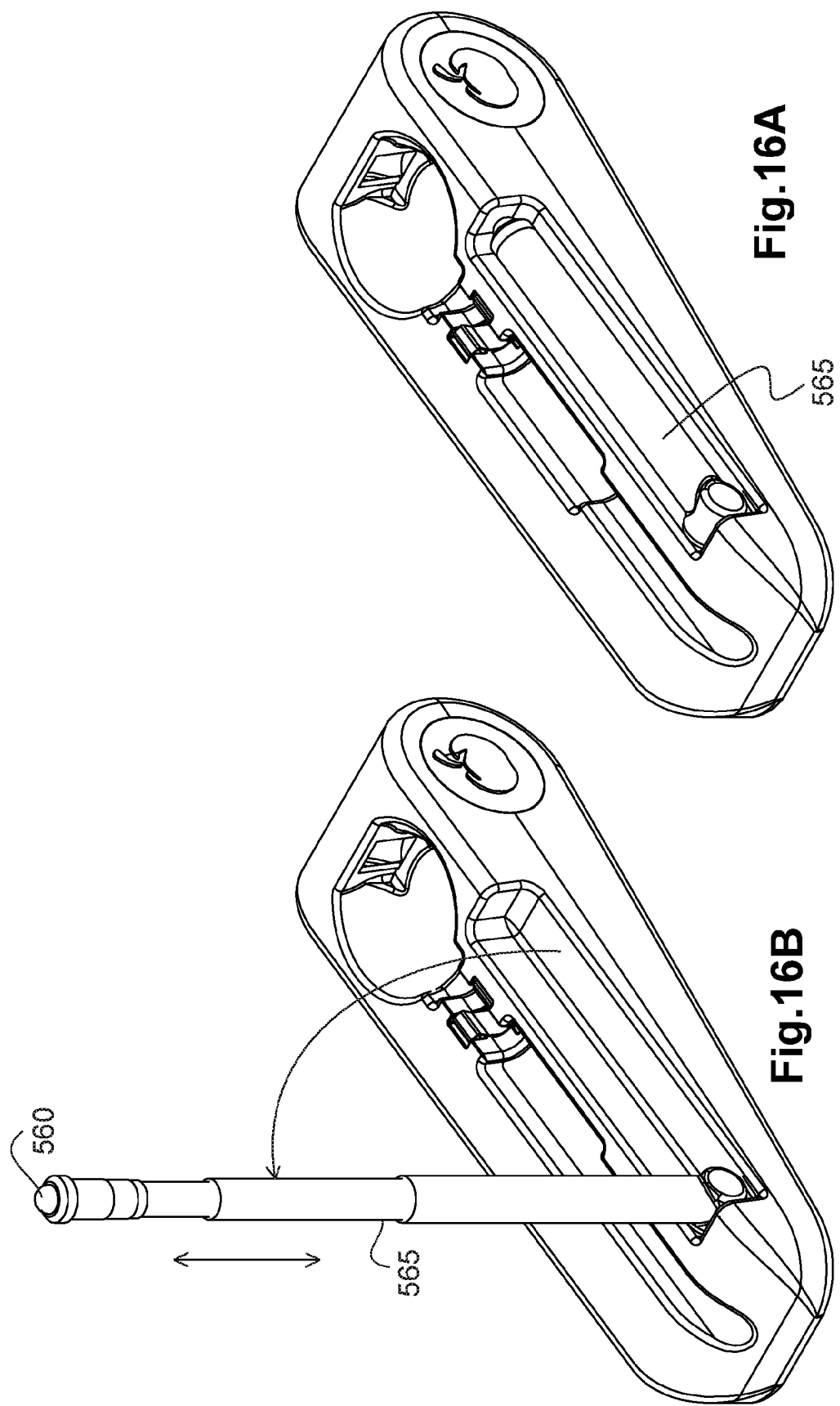
FIG. 16A is an oblique perspective view of the receptacle showing the telescopic arm stored.
FIG. 16B is an oblique perspective view of the receptacle showing the telescopic arm and the light deployed.

In option, FIGS. 16A and 16B, the battery housed on the receptacle is also used to power a LED light (560) included to the receptacle and to transform the receptacle on a BBQ light. The weight of the battery pack, preferably of the lithium-ion type, insures that the receptacle center of gravity is as low as possible, allowing the use of a telescopic arm (565) for the LED lamp.

At the other end, in an extension of the channel 502, 503, a tool 510 is provided that defines an aperture hook-shaped handling zone. This tool is separable, and securely fastened to a pull rod 515 which, at rest, is engaged like a drawer in a housing 516 located in the bottom part of the receptacle.

Before use, the probe is first extracted from its housing. Its end fitting S1C is placed in an intermediate widening 505 of the channel 502, 503. The wall of this widening 505 includes a magnet, which will activate the electronics of the probe S1. The probe may then be implemented, for example, by being inserted into a piece of meat, where it plays its role of temperature measurement, and of Bluetooth transmission, for example to a smart phone.

At the end of cooking, the tool 510 may be used to extract the probe from the piece of meat, as illustrated in FIGS. 7A to 7G. Afterwards, the probe, which is optionally cleaned, may be put back in its receptacle. The tool 510, which is also cleaned, is put back in the position illustrated in FIG. 5B. The separable character of the tool 510 allows it to be cleaned, because all of the receptacle 50 cannot easily be submerged in water.

The box B may ensure the recharge of the battery. This recharge of the battery S1-20 may be achieved by introducing the probe, where appropriate with its receptacle, into the box B, as illustrated in FIGS. 8A to 8C, when this probe is not in service. The housing B10 of the box B includes a pad B11, which makes contact with one of the electrodes of the probe, for example its positive electrode. This positive electrode is incorporated into the housing S1C-30 in FIG. 1B. Conductive fingers B121 and B122 are provided to touch a conductive ring of the probe S1, in the example its negative electrode. The contact of the conductive ring is referenced S1C-20 in FIG. 1B. Current may be supplied to the box B via a cable, for example of USB type, optionally with a buffer battery housed in the box. The USB port (not shown here) of the box may receive a stopper, when the USB cable is not plugged in.

The box B may serve as an external control unit, which includes a microcontroller, and a memory, which stores the thermometer data received in bursts, and ensures the communication thereof to the user. The memory may also contain desired temperature values (for example thresholds) stored by the microcontroller after reception from a user interface, for example via a USB link. The microcontroller reacts to differences between measured values and desired values to provide information to the user, via the user interface, by way of a visual or audio alarm, and/or by way of a temperature displayed on an LCD screen. The microcontroller also reacts to the interruption of the bursts of thermometer data, after a pre-set time, and/or after a pre-set number of missing bursts.

As illustrated in FIGS. 8A-8C, the box B may take the form of a knob mounted on a cover of the cooking utensil. The knob comprises a housing B10, encircled for example with silicone B11 and B12. The upper portion of the housing B10 here includes four rows of LEDs, under a seal-tight clippable lid B15, for example made of transparent thermoplastic. The upper portion of the housing also contains a USB port B16. Provision may also be made (as a variant or in addition) for a lateral USB port B17, which may receive a silicone stopper, when no USB cable is plugged in.

Each row of LEDs may be used to indicate a particular temperature. In one row, the light-emitting diodes have respective colors that correspond to pre-established temperature ranges, for example blue to cold, green to a temperature lower than 180° C., yellow to a temperature comprised between 180° C. and 250° C. and red to a temperature above 250° C. The same kind of code levels may be used for a moisture sensor.

If needs be, in particular if the knob B is placed on a hot portion of the cover of the cooking utensil, it may be mounted thereon via a base B19 with orifices forming a ventilation system. A thermoelectric cooler may be added, or a heat deflector that may take the form of a concave pressed steel sheet or of a ceramic plate. Internally, the box or knob B encloses the battery B20 and a processing unit B21, which comprises the microcontroller, and its memory.

One advantageous embodiment will now be described with reference to FIGS. 9 and 9A-9C. In FIG. 9, the knob B is mounted on a cover 160, a little above its external periphery, typically at an angle of 10 to 45° measured at the center of the cover with respect to the horizontal. Once again, the knob B contains a battery B20 and a microcontroller B21, with a USB port. It also contains an electromagnetic transmitter B30, which is driven by the microcontroller B21. This electromagnetic transmitter B30, which for example employs Bluetooth, may dialogue with an external controlling apparatus, which may be a smart phone, or even a system for controlling the cooking assemblage temperature-wise.

The ventilation base B19 is equipped with an electromagnetic receiver B40, which for example also employs Bluetooth. It ensures the link with a probe S1 of the aforementioned type, which is housed under the cover, which is, if needs be, made transparent to the electromagnetic waves, at least locally. Various connections with the microcontroller B21 may pass through an axial tube B41 of the ventilation base B19: a connection to the Bluetooth receiver B40, a connection to a sensor T2 of ambient temperature, and/or a connection to a moisture sensor T4, and/or a connection to a sensor T1 of surface temperature.

These connections may be wired, or Bluetooth, as described with respect to the probe S1. The sensor T1 may be placed on an end fitting B50 fastened to the end of the tube B41, and turned downwards. The sensor T1 may be mounted on a spring B51, which forces the sensor T1 to make contact with a hot plate. The attachment of the knob B to the cover 160 is illustrated schematically by a wing nut B60. The external face of the knob B may include an LED display screen, referenced B70, as illustrated in FIG. 9A.

The off-centre arrangement of the knob B has various advantages: avoids placing the knob in the hottest zone (the apex of the cover), better location for the user, who may read the screen B70 more easily than if it were at the apex of the cover, easier to insert a USB cable, avoiding burns, for the same reason, since the cover is hinged opposite the knob to a hot-plate type base, easy to raise the cover using the knob (FIGS. 9B and 9C). If needs be, a cable may also be passed under the edge of the cover, and run, via the exterior, to the knob, under suitable thermal and electrical insulation. Such a cable may be used, as a variant, to connect the probe T1 to the microcontroller of the knob, via the exterior. One portion of this cable may pass, under guttering, in the interior of the cover.

Tests carried out by the Applicant have shown that the aforementioned construction of the knob B does not engender internal temperatures in excess of 100° C., whether the mode of cooking be of barbecue or plancha type (e.g. as shown in FIGS. 10 and 11), in particular. This is therefore tolerable for the components and their electrical power supply. The plancha 100 of FIG. 10 includes a handle 104 and a linking mechanism 111 that links the handle to the body 103. The body includes a cooking plate 105 with a cooking surface 131. The body 103 also includes a lip 109 to prevent spillage. FIG. 11 shows a side view of the plancha 100 that additionally shows a layer of material 135 and a bottom surface 133 with one or more heat transferring elements 107.

Figure 12:
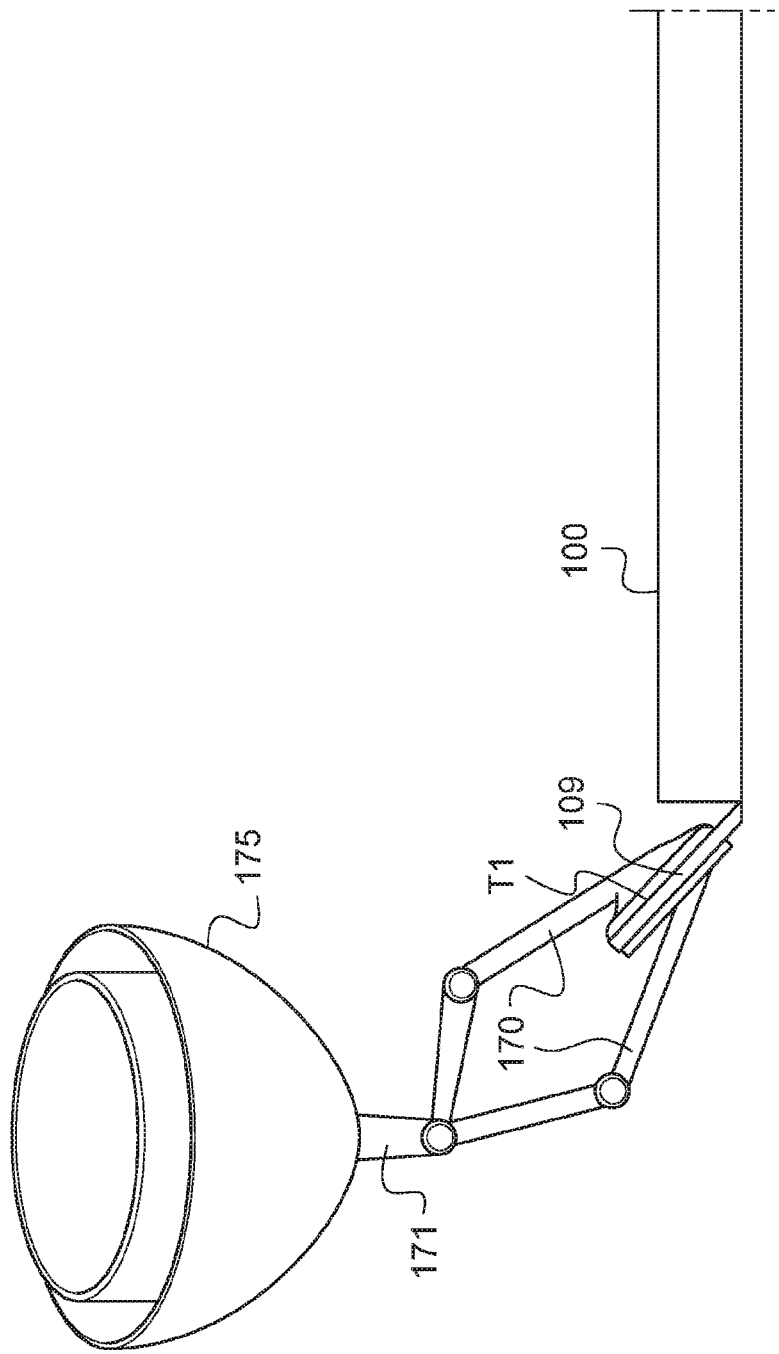
FIG. 12 shows a variant of the invention, applicable in particular to the utensil in FIGS. 10 and 11.

FIG. 12 illustrates an embodiment in which a clasping mechanism 171 uses clasps 170 to grab a handle 109 of the cooking utensil 100 of FIG. 10. A grip 175 may be fastened to the clasping mechanism 171, allowing more functional use of the clasps 170. Thus, a cooking apparatus is obtained that is capable of multipurpose measurements: ambient temperature, moisture level, temperature in the interior of foodstuffs in the process of cooking, working temperature in the cooking zone.

Such as described above, the sensor T1 delivers the surface temperature on the border of the cooking zone. For a given apparatus, it is possible to deduce therefrom, by extrapolation, the surface temperature at the center of the cooking zone. The four measurements may be respectively displayed on the four rows of LEDs, as already described, and/or displayed on the screen B70, at least partially. Preferably, they are transmitted to a controlling apparatus, which may be a smart phone, operating in Bluetooth. The latter may return instructions to the microcontroller B21.

Returning to the probe S1, at least some of the processing done by the processing unit B21 of the box may be delegated to the processing unit S1-30 of the probe. As the probe may also be equipped with Bluetooth reception functions, it may dialogue directly with a controlling apparatus, operating in Bluetooth, which may be a smart phone, or a system for controlling the cooking temperature of the assembly. Thus an unequalled flexibility is obtained in the control of the cooking apparatus, on the basis of precise temperature data and, where appropriate, moisture-level data.

Provision was made above for various levels of thermal protection of the described elements. The chosen level of protection will possibly be adapted to the context. For example a barbecue, subject to flames, will require more thermal protection than an oven, in particular as regards the probe. Embodiments of the invention are not limited to the examples of utensils described above, merely by way of example, but encompasses any variant and any combination of these utensils that a person skilled in the art is able to envision.

Figure 13:
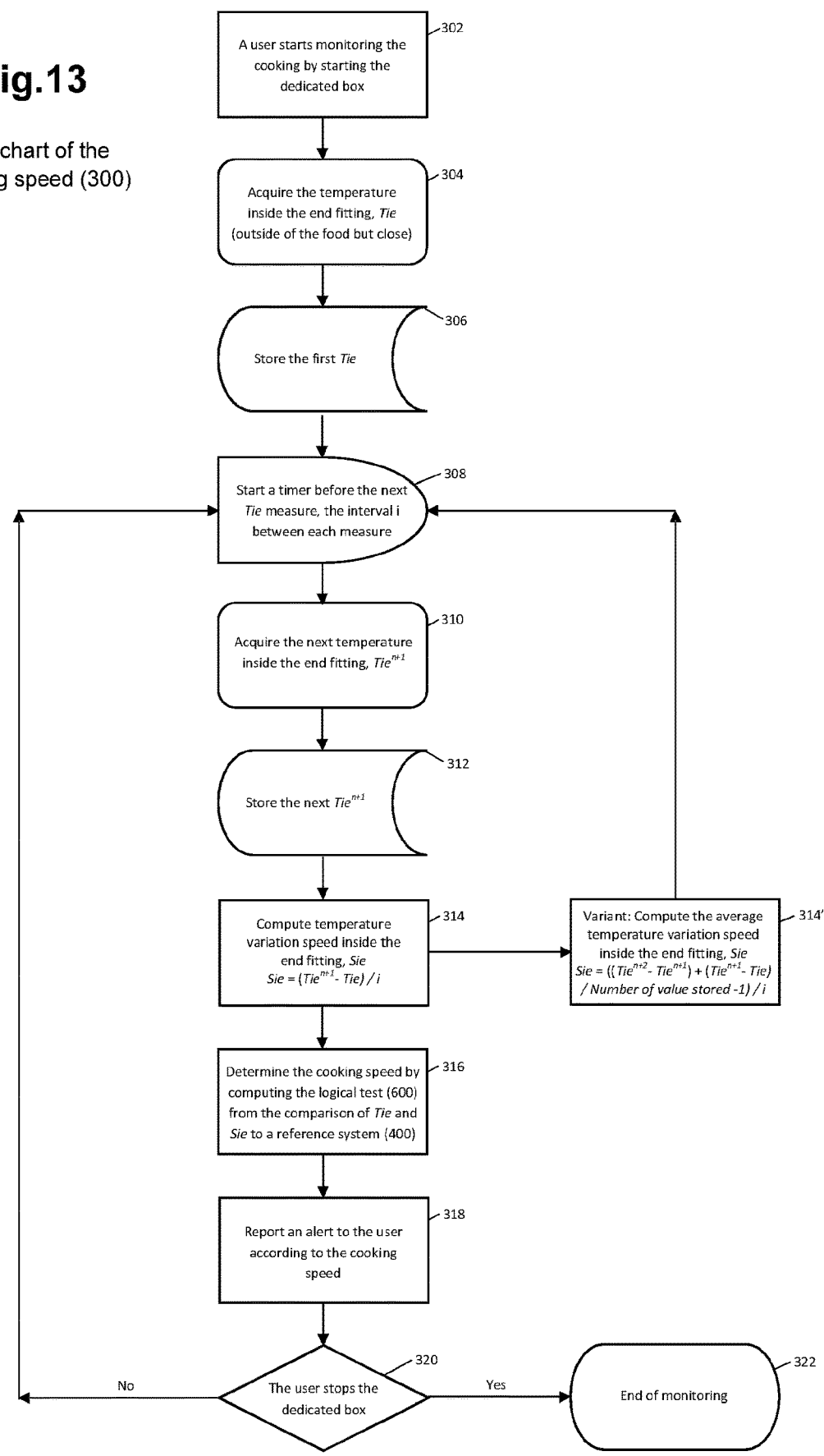
FIG. 13 shows the flowchart of the cooking speed.

FIG. 13 illustrates an exemplary method of the cooking speed calculation based on the simple temperature variation measurement. The simple variation method illustrated by the flow diagram (300) beginnings by the user starting monitoring the cooking (302), through the dedicated box, to acquire the temperature inside the end fitting, here named Tie (304), from outside the food and close to it. The Tie is stored by the box (306) and following by a timer launched like an interval i before the next Tie measure (308). After the interval i required between each measure, the next Tie is acquired from the end fitting and named $Tie^{n+1}$ (310). The next $Tie^{n+1}$ is stored by the box (312), and with the previous Tie, computed to calculate the temperature variation speed inside the end fitting, named Sie, unit of measurement degree/s (314), from the formula: $Sie=(Tie^{n+1}-Tie)/i$.

The cooking speed is determined by a logical test of the Tie and the Sie compared to a reference system (316). According to the reference system (400) FIG. 14, an alert is reported by the box to the user whether several conditions are true (318). The user decides to stop the cooking (320) and stops the measures (322) or to continue and that reboots to the 108 sequence with the interval before the next Tie stored to compute a new Sie.

In alternative, the cooking speed can be determined by calculate an average of the Sie (from several simple measures) and illustrated by the flow diagram (314'), in replacement of the simple calculation and by more than two consecutive Tie, at least three and the average of the difference between two Tie from the formula with, for instance, using three measures: $Sie=((Tie^{n+2}-Tie^{n+1})+(Tie^{n+1}-Tie)/\text{Number of value stored}-1)/i$.

Figure 14:
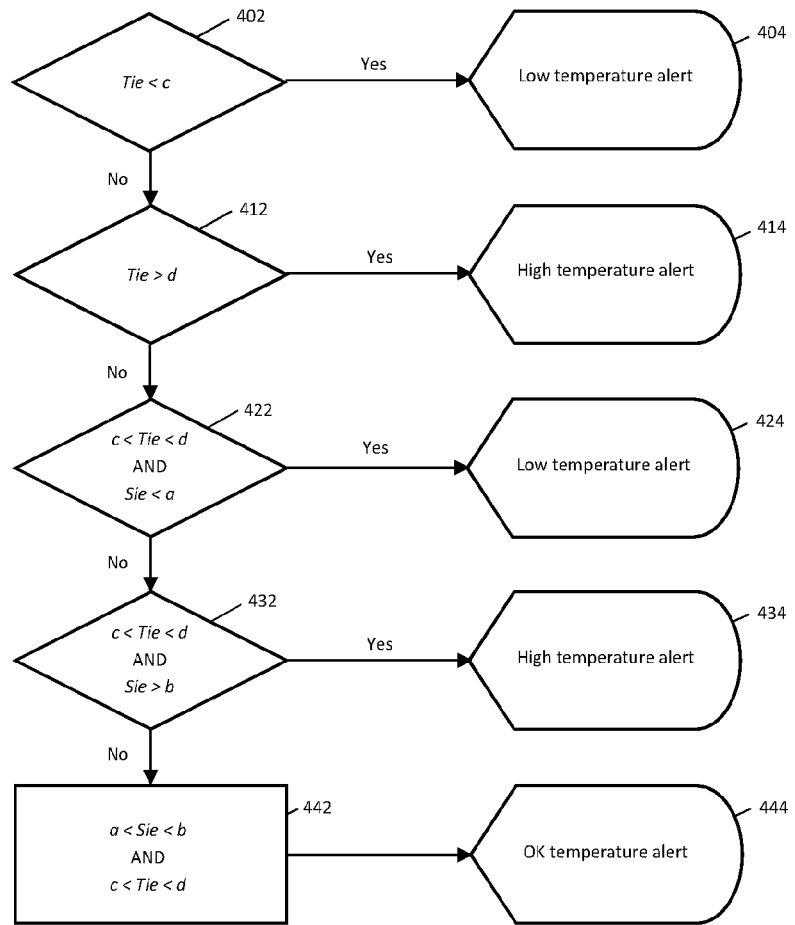
FIG. 14 shows the reference system used to determine the cooking speed.

The reference system (400) of FIG. 14 used in the determination of the cooking speed from several cooking situations can be defined as below. According to different situation seen during the cooking, some constant speed and degree establish a reference or a limit before alerting of a cooking situation and release an alert to the user: a is the limit cooling speed out of heat, b is the limit heating speed determined from flare up, c is the coldness temperature limit, d is the burning point temperature limit.

The situation 402 is: Tie<c, meaning the temperature inside the end fitting is low and a low temperature alert is displayed (404). The situation 412 is: Tie>d, meaning the temperature inside the end fitting is high and a high temperature alert is displayed (414). The situation 422 is: c<Tie<d AND Sie<a, meaning the temperature inside the end fitting is between the low and the high limit and the temperature variation speed inside the end fitting is higher than the limit cooling speed, a low temperature alert is displayed (424).

The situation 432 is: c<Tie<d AND Sie>b, meaning the temperature inside the end fitting is between the low and the high limit and the temperature variation speed inside the end fitting is higher than the limit heating speed, a high temperature alert is displayed (434). The situation 442 is: a<Sie<b AND c<Tie<d, meaning the temperature variation speed inside the end fitting is normal and the temperature inside the end fitting is between the low and the high limit, a good or OK temperature alert is displayed (444).

Figure 17:
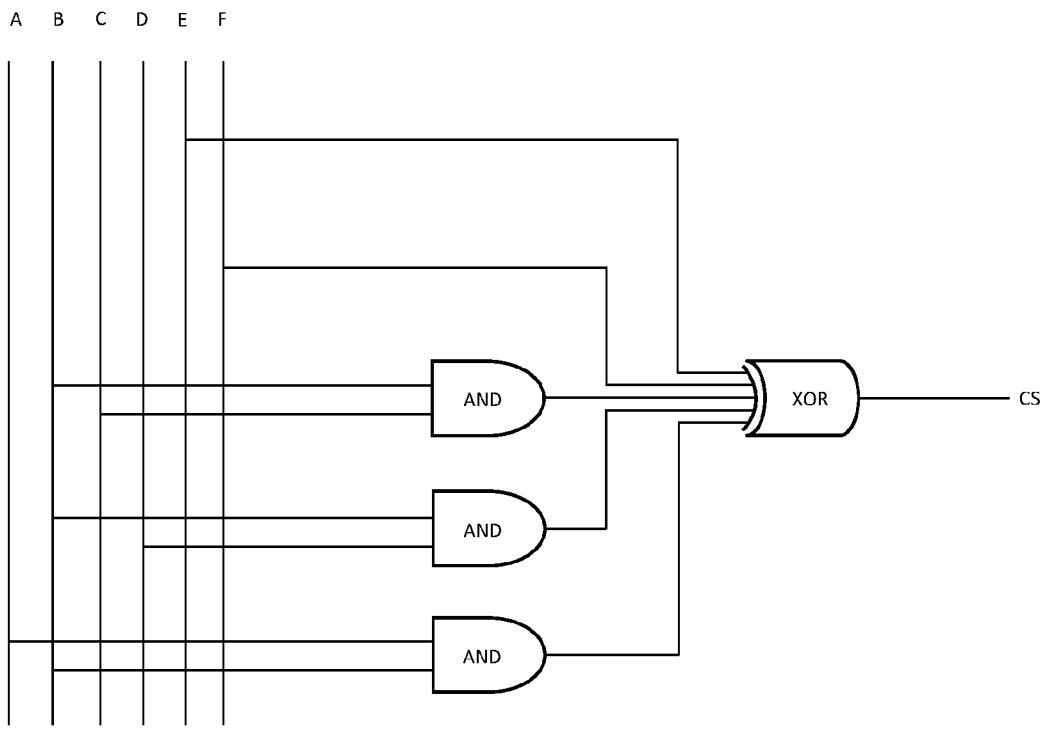
FIG. 17 shows a logic diagram of cooking speed.

The logical test (600) of FIG. 17 is computed by the box to determine the cooking speed and is made by several logic gates issued from those cooking situations described above, in order to warn the user of the cooking situation by an alert. This logical test is defined below: The logical test ("CS" herein) is established from Boolean algebra with a logic equation: $CS = E \oplus F \oplus (B \cdot C) \oplus (B \cdot D) \oplus (A \cdot B)$. Variables of the CS equation from the reference system are as follows: A=a<Sie<b, B=c<Tie<d, C=Sie<a, D=Sie>b, E=Tie<c, F=Tie>d.

Figure 15:
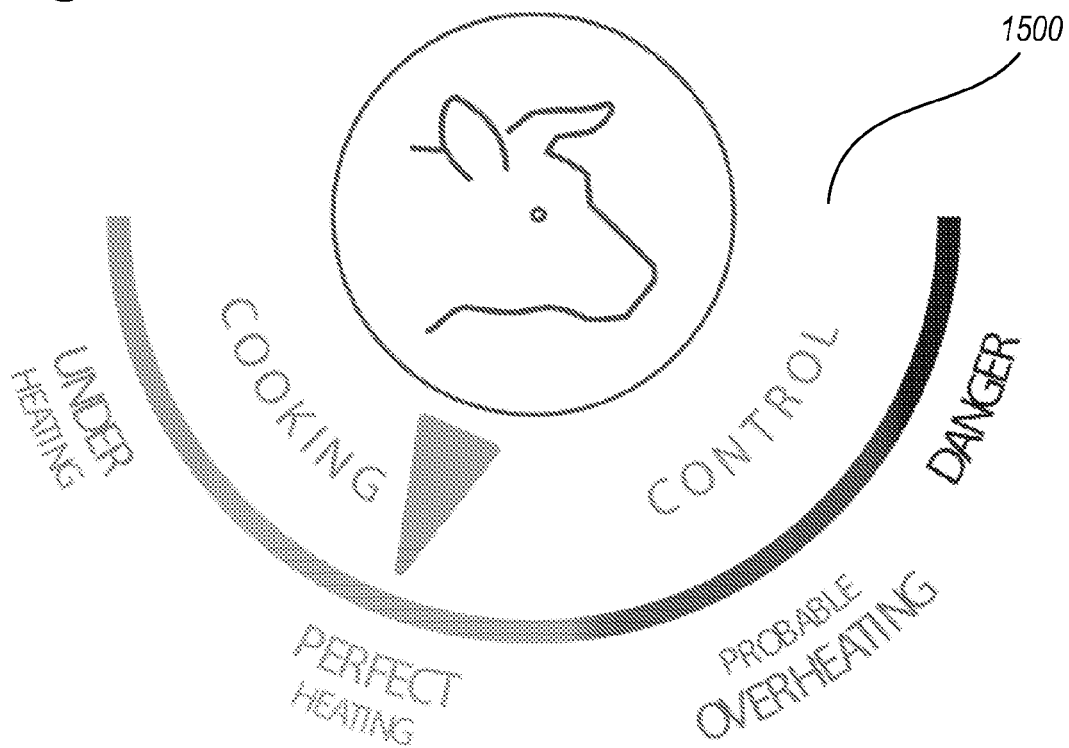
FIG. 15 shows the cooking control, one of a possible cooking speed dial with several stages.

The cooking speed on our purpose can be translated on a visual solution and by a dial 1500 with several stages FIG. 15, determined according to the alert given from the result of the logical test in comparison to the reference system. The dial 1500 shows some particular stages with for example: Blue stage: Low temperature—Under Heating, Green stage: Good temperature—Perfect Heating, Orange stage: Mid-High temperature—Probable Overheating, Red stage: High temperature—Danger. Although these four stages are shown, it will be understood that substantially any number of different stages may be shown on the dial or on a similar user interface.

In addition, this sensor is also able to sense the amount of or increase in heat transfer from the outside ambient conditions to provide warning of adverse conditions. The specifically known responses of the thermometer probe allow temperature measurements of the interior to be used for that purpose.

Advantageously, provision is also made for a membrane of PTFE type, which may be placed between the contact for recharging the battery and the end fitting or even between the shaft of the probe and the end fitting. It ensures the tightness to air, moisture and dust of the end fitting from the external environment, allows the probe to release positively pressurized hot air from the end fitting to the exterior, in order to decrease the internal pressure and temperature in the latter. This membrane of PTFE type may also be placed at the junction of the layers composing the end fitting when the latter possesses a plurality thereof, with the same function as above.

In one embodiment, the toolkit for aiding with cooking furthermore includes a receptacle, intended to house the thermometer probe, for its storage, its protection from shocks, its implementation, and the recharge of its battery. Furthermore, the receptacle may include at one of its ends a handling zone, suitable for being engaged with the end fitting in order to extract the probe from the heated milieu, and thermally resistant to a temperature of at least 180° C. This handling zone may be a portion separable from the receptacle.

The toolkit may be used in an enclosure of the oven type, or a cooking zone surmounted with a cover, or even a culinary siphon. It may be provided with a box provided with a receiver, and arranged so as to receive data transmitted by the emitter when the thermometer probe is in service. This box may be placed on a cover or on an edge of the enclosure or on a culinary siphon. It may be placed in immediate contact with the enclosure. It may be removable.

The box may also take the form of a smart phone, a tablet, or a computer, or of a system for controlling functions of a cooking enclosure, for example a computing entity equipped with a piece of software or application that is suitable for continuously performing the following actions: receiving, recording, showing and managing cooking times, temperatures, and interruptions of communication.

According to other features: the closed enclosure is an enclosure of the oven type; or a cooking zone, of the plancha or barbecue kind, surmounted with a cover, the box is placed on a cover or on an edge of the enclosure. The toolkit may even furthermore comprise some at least of the following elements: a contact thermometer arranged to measure the temperature of a cooking surface of an enclosure, an ambience thermometer arranged to measure the ambient temperature in the enclosure, and/or a probe thermometer arranged to be sunk into foodstuffs and to measure the internal temperature thereof during cooking, some at least of these thermometers are equipped with an emitter arranged so as to send data to the receiver of the box.

Provision may also be made for a moisture sensor arranged to measure the moisture level in the enclosure, and arranged so as to send data to the box. The box may communicate with a user interface arranged to give information to the user depending on data received by the box, this user interface comprising a screen or a set of status lights, or an audio emitter and/or a microphone, or a system for setting cooking temperature. This user interface may take the form of a telephone, a tablet, a computer or another computing entity capable of accommodating a dedicated application, in firmware and/or software form.

The box may also comprise a transmitter arranged so as to send data representative of the data received by the box to an apparatus remote from the enclosure or to one or more contact, ambience and probe thermometers, in order to control or reprogram them simultaneously. Also having the possibility to rename by the box those thermometers from a basic serial number tag to a recognizable tag and specify their utilization according to the cooking.

This transmitter may be housed in a knob of a cover. The box may comprise an housing able to receive the thermometer probe or a receptacle thereof, for the purpose of tidying it away, protection from shocks and/or recharge of its battery and/or its set up. The box may also be associated with a heat shield. For its part, the thermometer probe may be provided with an emitter, where appropriate a receiver and a processing unit, which are implanted in a double-skinned metal and/or thermoplastic and/or glass or ceramic casing equipped with a ceramic cap that is at least partially transparent to electromagnetic waves such as Bluetooth waves.

One of the layers may be equipped with spurs intended to be plunged into an eatable that is in the process of cooking, to serve as heat sinks and to maintain the probe in place during the cooking of the eatable, in particular using barbs with which the spurs are equipped. The spurs may be mounted on a ring and this ring may be assembled on the end fitting, preferably close to the shaft, a location lower exposed to the heat due to the immediate proximity of the food, and can be used as one charging pin, in order to recharge the battery.

The probe S1 may emit by bursts the frequency which decreases with the increase of the cooking time to reduce the electrical consumption and save the battery life, in order to permit a long duration use, such as the barbecue smoker, and a small battery size with the probe. Furthermore, the one or more probes may be sealably mounted for use in a steam oven or pressure cooker or culinary siphon.

In one embodiment, a system is provided for aiding with the control of cooking. The system includes a thermometer probe (e.g. SI of FIG. 1) that includes an emitter (e.g.

wireless emitter PCB SIC-10), a battery power supply (e.g. S1-20), and a thermally conductive shaft (e.g. S1T) with at least one temperature sensor (e.g. SI-10). The thermally conductive shaft is positioned in the interior of a heated milieu (e.g. a food item). The thermally conductive shaft includes a tip at a first end, and an end fitting (e.g. SIC) at a second end. The temperature sensor is positioned in the thermally conductive shaft, in thermal contact with the thermally conductive shaft including the tip at the first end. Furthermore, the end fitting is hollow such that the end fitting houses the electromagnetic wave emitter and a second temperature sensor (e.g. T3').

The end fitting S1C may include one or more superposed portions arranged in distinct layers. The upper layer may be made of a material that is both thermally insulating and permeable to electromagnetic waves. As noted above, the end fitting to S1C may be hollow, and may be filled by an internal insulating layer. An internal insulating layer may be positioned between each layer of the end fitting if multiple internal insulating layers are present in the system. The upper layer of the end fitting may be removable. As such, it may be interchanged with other layers made out of different types of materials. The hollow end fitting may be designed to house multiple different components including an overheating indicator positioned beside the electromagnetic wave emitter. The overheating indicator may include a small rod of a few millimeters thickness, made of thermoplastic that degrades irreversibly at a temperature above, for example, 200° C.

The hollow end fitting S1C may further house a second (or even third or more) temperature sensor. The second temperature sensor may be positioned substantially beside the electromagnetic wave emitter in the interior of the end fitting without direct contact to an outside portion of the thermometer probe. In this manner, the second temperature sensor is isolated from the outer portion of the thermometer probe. In some cases, the thermometer probe includes the temperature sensor of the thermally conductive shaft and the second temperature sensor of the end fitting, and is linked to the receiver box by an electrical wire, by an optical fiber, or by some other means of transferring data. The second temperature sensor thus measures the internal temperature of the end fitting, and the wire, optical fiber or electromagnetic wave emitter transfer data representing the determined temperature inside the end fitting.

Upon receiving the internal temperature data from the second temperature sensor, the receiver box computes a temperature variation speed over a specified interval and determines an associated cooking speed for the heated milieu. The receiver box performs a logical test using a reference system, and issues a determined cooking speed based on the logical test. If, for example, a red stage or a blue stage are detected (as shown in FIG. 15), an alert may be generated and sent to the user to warn them that the internal temperature is too low or too high.

In some embodiments, the thermometer probe may further include a receptacle that houses the thermometer probe. The receptacle provides storage and protection from vibrations. The receptacle may also include, on at least one end, a handling zone, suitable for being engaged with the end fitting in order to extract the probe from the food contained in the heated milieu. Wherein the handling zone is thermally resistant to a temperature of, for example, at least 180° C. The handling zone may be a separate portion that is separable from the receptacle.

The receptacle may include a buffer battery to power various items including an LED light. The LED light can be mounted on a telescopic arm to transform the receptacle on a BBQ light. The buffer battery housed on the receptacle is also used to recharge the battery of the probe independently of the USB. In addition to the receptacle, a box may be provided with a receiver. The box may be configured to receive data transmitted by the emitter when the thermometer probe is in service. The box can be a smart phone, a tablet, a computer, or another computing entity equipped with a piece of software or application that is suitable for receiving, recording, showing and managing cooking times, temperatures, and interruptions of communication. The application may allow user interaction with the thermometer probe, in addition to showing current temperature, alerts and determined cooking speeds.

Additionally or alternatively, the thermometer probe may include a contact thermometer arranged to measure the temperature of a cooking surface of an enclosure, an ambience thermometer arranged to measure the ambient temperature in the enclosure, and a probe thermometer arranged to be sunk into foodstuffs and to measure the internal temperature of the foodstuffs during cooking. The temperature sensor may be placed inside the thermally conductive shaft, while the second temperature sensor is positioned inside the end fitting. The second temperature sensor is not in contact with an outside environment, which protects it from overheating. At least some of the above thermometers may be equipped with their own emitters configured to send data to the receiver of the box. The box communicates with a user interface arranged to give information to the user depending on data received at the box. This user interface may include a screen or a set of status lights, or an audio emitter and/or a microphone, or a system for setting cooking temperature. The user interface may provide a means for interacting with any or all of these elements.

The box may include a transmitter arranged so as to send data representative of the data received by the box to an apparatus remote or to one or more thermometers including contact, ambience and probe thermometers. This data may be sent in order to control or reprogram the thermometers simultaneously. In some cases, the end fitting is formed in an ovoid shape, substantially devoid of right cylindrical surfaces. This decreases the amount of thermal radiation that the end fitting absorbs.

A charging pin may be positioned at the top of the end fitting, inside a concave cavity so as to avoid radiant heat. The external surface of end fitting may be primarily made of highly reflective ceramic or other insulating materials. The upper layer of the end fitting may be equipped with spurs that are plunged into an eatable, to serve as heat sinks and to maintain the thermometer probe in place during the cooking of the eatable. The spurs may be mounted on a ring. This ring, located on the end fitting close to the shaft, can be used as a charging pin, in order to recharge the battery. In order to prolong battery life, the thermometer probe may be configured to emit data in bursts over time. This reduces electrical consumption and saves battery life. This also allows a smaller battery to be used within the thermometer probe.

As one skilled in the art will note, different types of food have different cooking patterns. Some food is to be cooked quickly at high heat, while other food is to be cooked more slowly at a lower heat. For example, meats are often grilled at a high heat level or smoked at a relatively low heat level. Even among meats, different types of meat will cook differently. Some meats are denser, some have more fat content, some have more fiber content, some are shaped differently than others, some leave the bone in, etc. Accordingly, multi-functional sensors are provided herein that help detect how the meat (or other food item) is cooking. Indeed, the sensors may detect the amount of humidity in the air, the amount of moisture in the meat, the amount of smoke in the grill or smoker, the amount of salinity in the meat, or other means of determining a cooking pattern. Once an appropriate cooking pattern has been determined, it can be used by the smoker or grill.

Figure 18A:
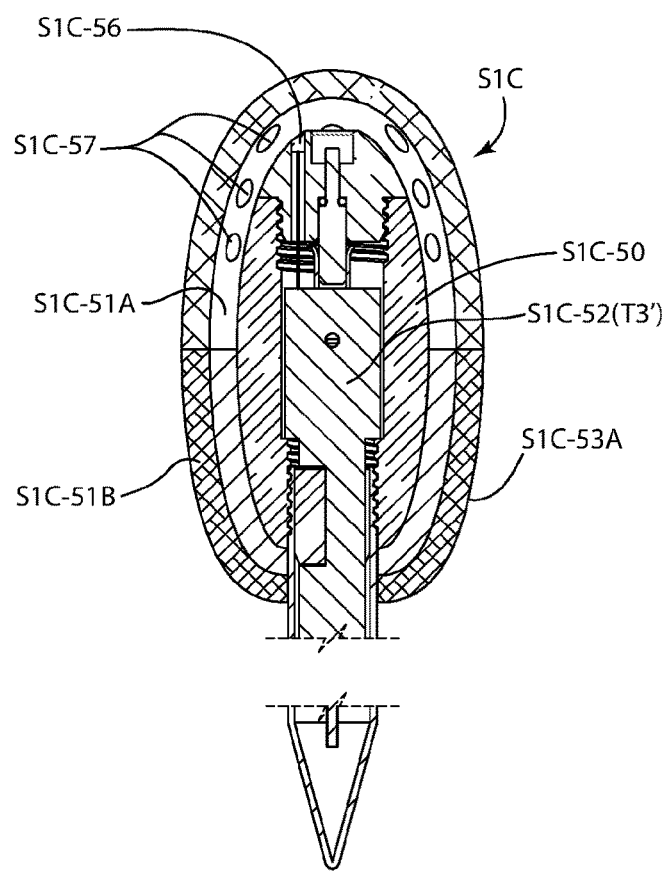
FIGS. 18A and 18B show embodiments of a wireless temperature probe with a multi-sensor configured to detect smoke, salinity or moisture.
Figure 18B:
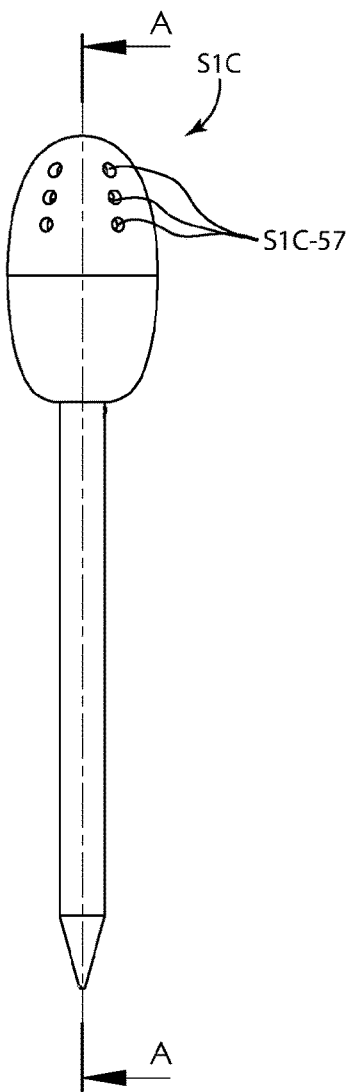

These sensors that analyze the amount of smoke, humidity, moisture or salinity, may be embedded in a wireless probe. For example, the wireless probe of FIGS. 18A and 18B may be used to control a cooking pattern by detecting certain cooking characteristics within a cooking system (e.g. a BBQ, grill or smoker). The wireless thermometer probe S1C may be part of a system for aiding with the control of cooking. The system includes a thermometer probe an electromagnetic wave emitter (e.g. a wireless emitter on PCB S1C-10), a controller unit and/or a central processing unit (e.g. on chip S1C-10), a battery power supply (e.g. S1-20), and a thermally conductive shaft (e.g. S1T) with at least one temperature sensor (e.g. S1-10). The thermally conductive shaft is positioned in the interior of a heated food item. The thermally conductive shaft includes a tip at a first end, and an end fitting (e.g. S1C) at a second end. The battery, the controller unit and/or the CPU are positioned in the thermally conductive shaft, along with the temperature sensor which is in thermal contact with the thermally conductive shaft. The end fitting S1C is hollow such that the end fitting houses the emitter and a second temperature sensor (e.g. T3').

The end fitting S1C may have a multilayer skin with internal walls (e.g. S1C-51A and S1C-51B). External walls S1C-53A and S1C-53B follow a generally ovoid shape, although it will be recognized that other shapes may be used. Interior end fitting (S1C-52) may be threaded into position within the core S1C-50. A multi-function sensor S1C-56 (also referenced T5 below) (or at least one sensor performing at least one task as defined below) may be positioned inside the end fitting S1C. In some embodiments, the multi-function sensor may be positioned beside the second temperature sensor T3'. This multi-function sensor T5 may be configured to analyze the chemical and physical characteristics in a BBQ, oven, smoking chamber, vapor oven or other similar device. The chemical and physical characteristics may include measurements of surrounding air within the device, steam levels within the device, amount of smoke generated while cooking, salinity or moisture content of the meat, or other characteristics, in addition to temperature.

The end fitting may include an upper layer that is a different layer from the second temperature sensor location. This upper layer may be configured as a sensing chamber for the multi-function sensor T5. For example, the end fitting may be hollow with the upper layer being open on the outside through one or more holes (e.g. S1C-57) (as shown in both FIGS. 18A and 18B). The holes may allow air, steam and smoke to enter within the end fitting S1C, and allow the multi-functional sensor T5 to make the detections. Once the multi-functional sensor has performed its measurements, the electromagnetic wave emitter of the thermometer probe is used to transmit data to a receiver box. This data feed allows users to continually record the cooking of the food item. As with the other embodiments herein, the data may be provided to a user interface such as that shown in FIG. 15.

The user interface may provide additional information including, for example, indicating a current salinity level, or a current humidity level, or a current smoke density level. Using this information, the user may then make adjustments to the grill, BBQ or smoking device to ensure that the food item is properly cooked. In some embodiments, the multi-function sensor communicates using the emitter to the receiver box or directly to a culinary enclosure device. The multi-function sensor may provide, in the communication, instructions indicating whether to reduce or increase the heat level, humidity level, smoke level, or salt level. The culinary enclosure device may then react to the information automatically by adjusting flame level or smoke level or humidity level to better cook the food item.

Accordingly, systems, methods and apparatuses are provided for aiding with the control of cooking. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A system for aiding with the control of cooking, comprising:
   a thermometer probe including:
      a wireless emitter;
      a controller unit and/or a central processing unit configured to receive wireless signals;
      a battery power supply; and
      a thermally conductive shaft with at least one first temperature sensor, wherein the thermally conductive shaft is positionable in the interior of a heated milieu, the thermally conductive shaft including a tip at a first end, and an end fitting at a second end;
         wherein the battery power supply, the controller unit and/or the central processing unit are positioned inside the thermally conductive shaft,
         wherein the first temperature sensor is positioned in the thermally conductive shaft and in thermal contact with the thermally conductive shaft,
         wherein the end fitting is hollow such that the end fitting houses the emitter and a second temperature sensor, and
         wherein the end fitting includes an upper layer that is thermally insulating and permeable to electromagnetic waves, and wherein the upper layer of the end fitting is removable in order to be interchangeable.

2. The system according to claim 1, wherein the end fitting:
   comprises one or more superposed portions arranged in distinct layers, at least the upper one of which comprises a material that is thermally insulating and resistant and permeable to electromagnetic waves; or
   is filled by an internal insulating layer and/or by an internal insulating layer between each layer of the end fitting if multiple internal insulating layers are present in the system; or
   houses an overheating indicator positioned beside the electromagnetic wave emitter in the interior of the hollow end fitting wherein the overheating indicator comprises a small rod of a few millimeters thickness, made of thermoplastic that degrades irreversibly at a temperature above 200° C.; or
   comprises an upper layer that is equipped with spurs intended to be plunged into an eatable, to serve as heat sinks and to maintain the thermometer probe in place during the cooking of the eatable.

3. The system according to claim 1, wherein:

the second temperature sensor is positioned substantially beside the wireless emitter in the interior of the end fitting without direct contact to an outside portion of the thermometer probe; or the thermometer probe, including the temperature sensor of the thermally conductive shaft and the second temperature sensor of the end fitting, is linked to a receiver box by an electrical wire or by an optical fiber; or the probe emits by bursts the frequency which decreases with the increase of the cooking time.

4. The system according to claim 3, wherein the receiver box comprises a transmitter arranged so as to send data representative of the data received by the receiver box to an apparatus remote or to one or more contact, ambience and probe thermometers, in order to control or reprogram the thermometers simultaneously and/or to control or reprogram a cooking enclosure associated with the receiver box.

5. The system according to claim 3, wherein the second temperature sensor is configured to measure and transmit data to the receiver box, in order to continually record the internal temperature of the end fitting.

6. The system according to claim 5, wherein the thermometer probe or the receiver box comprises an additional temperature sensor and a moisture sensor configured to continually record a temperature and moisture level within a cooking enclosure associated with the receiver box.

7. The system according to claim 6, wherein the receiver box computes a temperature variation speed over a predetermined time interval and determines an associated cooking speed for the heated milieu, and wherein the receiver box determines the cooking speed from a logical test compared to a reference system to warn the user of the cooking situation by an alert.

8. The system according to claim 5, wherein the receiver box computes a temperature variation speed over a predetermined time interval and determines an associated cooking speed for the heated milieu, and wherein the receiver box determines the cooking speed from a logical test compared to a reference system to warn the user of the cooking situation by an alert.

9. The system according to claim 8, wherein the receiver box comprises a display that is configured to display the cooking speed and/or a detected moisture level the detected moisture level being detected by a moisture sensor that is part of the thermometer probe or the receiver box.

10. The system according to claim 9, wherein the receiver box is configured to:

determine whether the cooking speed is too slow, too fast, or normal; and send signals to a cooking unit associated with the system to adjust a cooking temperature if the cooking speed is too slow or too fast.

11. The system according to claim 10, further comprising a humidity sensor in communication with the receiver box, the humidity sensor being configured to detect a humidity level within the cooking unit and communicate the humidity level to the receiver box.

12. The system according to claim 9, wherein the receiver box is configured to be mounted to a cooking unit and comprises a fan or vent or is in communication with a fan or vent associated with the cooking unit, the receiver box being configured to activate the fan or vent to regulate a temperature of the cooking unit based upon the detected cooking speed.

13. The system according to claim 12, wherein the receiver box is configured to activate the fan or vent to regulate the humidity level within the cooking unit.

14. The system according to claim 1, characterized in that:

the end fitting possesses at least partially an ovoid shape, thereby decreasing the amount of thermal radiation that it absorbs; and/or a charging pin is located at the top of the end fitting, inside a concave cavity as to avoid radiant heat; and/or the external surface of end fitting is primarily made of highly reflective ceramic.

15. The system according to claim 1, further comprising a receptacle that houses the thermometer probe, wherein the receptacle includes, on at least one end, a handling zone, suitable for being engaged with the end fitting in order to extract the probe from the food contained in the heated milieu.

16. The system according to claim 15, wherein:

the handling zone is a portion separable from the receptacle; and/or the receptacle includes a telescopic arm connected thereto, a buffer battery to power an LED light mounted on the telescopic arm.

17. A method, using the system of claim 1, for computing cooking speed by computing a temperature variation speed inside an end fitting from a temperature difference inside the end fitting, the method comprising:

initializing a receiver box to monitor the cooking of an item, the receiver box being configured to receive data transmitted by an emitter in a thermometer probe;

acquiring a current temperature reading for the temperature inside the end fitting;

storing the current temperature reading;

starting a timer for a predetermined time interval before the next temperature reading;

acquiring a subsequent temperature reading inside the end fitting after the interval;

storing the subsequent temperature reading;

computing a temperature variation speed inside the end fitting;

determining the cooking speed by comparing the initial temperature reading, the subsequent temperature reading and the temperature variation speed to a reference system; and providing a report to a user notifying the user of the determined cooking speed.

18. The method of claim 17, wherein in the temperature variation speed inside the end fitting is calculated according to the formula:

$$Sie = (Tie^{n+1} - Tie)/i,$$

where Sie is the temperature variation speed inside the end fitting, where Tie is the initial temperature reading, where i is the predetermined time interval between each temperature reading, and where $Tie^{n+1}$ represents the subsequent temperature inside the end fitting measured after a certain interval.

19. The method of claim 18, further comprising reporting the calculated temperature variation speed inside the end fitting to one or more users or to one or more receiver boxes.

20. The method of claim 17, further comprising computing the temperature variation speed inside the end fitting from an average of temperature differences inside the end fitting, wherein the temperature variation speed is calculated according to the formula:

$$Sie = ((Tie^{n+2} - Tie^{n+1}) + (Tie^{n+1} - Tie)/\text{Number of value stored} - 1)/i,$$

where Sie is the temperature variation speed inside the end fitting, where Tie is the initial temperature reading, where i is the predetermined time interval between each temperature reading, where $Tie^{n+1}$ represents a subsequent temperature inside the end fitting measured after a certain predetermined time interval, and where $Tie^{n+2}$ represents a further subsequent temperature inside the end fitting measured after a certain predetermined time interval.

21. The method of claim 17, further comprising establishing a reference system used in the determination of the cooking speed from a plurality of cooking situations.

22. The method of claim 17, wherein the cooking speed is determined by comparing of the cooking situations of the reference system, in order to warn the user of the cooking situation by an alert.

23. The method of claim 22, wherein where CS represents the cooking speed and the comparison of the cooking speed is established with the equation: $CS = E \oplus F \oplus (B \cdot C) \oplus (B \cdot D) \oplus (A \cdot B)$, where variables of the CS logic equation from the reference system are as follows: A=a<Sie<b, B=c<Tie<d, C=Sie<a, D=Sie>b, E=Tie<c, and F=Tie>d.

24. The method of claim 23, wherein the cooking speed is displayed on a visual indicator by: Blue stage: Low temperature—Under Heating, Green stage: Good temperature—Perfect Heating, Orange stage: Mid-High temperature—Probable Overheating, or Red stage: High temperature—Danger.

\* \* \* \* \*